US006723456B2

(12) United States Patent
Hayashi et al.

(10) Patent No.: US 6,723,456 B2
(45) Date of Patent: Apr. 20, 2004

(54) HEMATITE PARTICLES AGGREGATES, NON-MAGNETIC UNDERCOATT LAYER FOR MAGNETIC RECORDING MEDIUM USING THE SAME, AND MAGNETIC RECORDING MEDIUM HAVING THE NON-MAGNETIC UNDERCOAT LAYER

(75) Inventors: Kazuyuki Hayashi, Hiroshima (JP); Keisuke Iwasaki, Hiroshima (JP); Seiji Ishitani, Hiroshima (JP); Hiroko Morii, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 105 days.

(21) Appl. No.: 10/022,818

(22) Filed: Dec. 20, 2001

(65) Prior Publication Data
US 2002/0136928 A1 Sep. 26, 2002

(30) Foreign Application Priority Data
Dec. 25, 2000 (JP) ....................... 2000-393712

(51) Int. Cl.$^7$ ................................. B32B 5/16
(52) U.S. Cl. ............................... 428/694 BS; 428/328; 428/694 BN
(58) Field of Search .................... 428/694 BN, 694 BS, 428/328, 329

(56) References Cited

U.S. PATENT DOCUMENTS

| 4,496,626 A | 1/1985 | Kasuga et al. |
| 5,478,626 A | 12/1995 | Mori et al. |
| RE36,220 E | 6/1999 | Mori et al. |
| 5,922,464 A | 7/1999 | Hayashi et al. |
| 6,153,296 A | 11/2000 | Hayashi et al. |

FOREIGN PATENT DOCUMENTS

| DE | 32 08 503 A1 | 9/1982 |
| EP | 0 736 570 A1 | 10/1996 |
| EP | 0 941 966 A2 | 9/1999 |

*Primary Examiner*—H. Thi Le
(74) *Attorney, Agent, or Firm*—Nixon & Vanderhye P.C.

(57) ABSTRACT

Hematite particles aggregates as non-magnetic particles of the present invention are capable of forming a non-magnetic undercoat layer of a magnetic recording medium having a more excellent surface smoothness, which can exhibit not only an excellent dispersibility but also have an improving ability of a surface smoothness of a coating film produced therefrom by calendering treatment, a non-magnetic undercoat layer for magnetic recording medium which contains the hematite particles aggregates is exhibits a more excellent surface smoothness, and a magnetic recording medium having the non-magnetic undercoat layer, is exhibits a more excellent surface smoothness.

16 Claims, No Drawings

HEMATITE PARTICLES AGGREGATES, NON-MAGNETIC UNDERCOATT LAYER FOR MAGNETIC RECORDING MEDIUM USING THE SAME, AND MAGNETIC RECORDING MEDIUM HAVING THE NON-MAGNETIC UNDERCOAT LAYER

BACKGROUND OF THE INVENTION

The present invention relates to hematite particles aggregates, a non-magnetic undercoat layer for magnetic recording medium using the hematite particles aggregates, and a magnetic recording medium having the non-magnetic undercoat layer, and more particularly, to hematite particles aggregates as non-magnetic particles capable of forming a non-magnetic undercoat layer of a magnetic recording medium having a more excellent surface smoothness, which can exhibit not only an excellent dispersibility but also have an improving ability of a surface smoothness of a coating film produced therefrom by calendering treatment; a non-magnetic undercoat layer for magnetic recording medium which contains the hematite particles aggregates and exhibits a more excellent surface smoothness; and a magnetic recording medium having the non-magnetic undercoat layer, which exhibits a more excellent surface smoothness.

With recent tendency toward long-time recording, miniaturization and weight-reduction of video or audio magnetic recording and reproducing apparatuses, magnetic recording media such as magnetic tapes and magnetic discs have been increasingly required to have a higher performance, namely, a higher recording density, higher output characteristic, in particular, improved frequency characteristics and a lower noise level.

In particular, video tapes have been required more and more to have a higher picture quality, and the frequencies of carrier signals recorded in recent video tapes are higher than those recorded in conventional video tapes. In other words, the signals in the short wavelength region have come to be used and as a result, the magnetization depth from the surface of the magnetic tape has come to be remarkably small.

With respect to short wavelength signals, reduction in the thickness of a magnetic recording layer is also strongly demanded in order to improve the high output characteristics, especially, the S/N ratio of a magnetic recording medium. In order to achieve the reduction in thickness of the magnetic recording layer, it is required to smoothen the surface of the magnetic recording layer and eliminate unevenness in thickness thereof. For this purpose, the base film is also required to have a smooth surface.

In ordinary magnetic recording media, the surface of the magnetic recording layer has been smoothened by forming a magnetic recording layer containing magnetic particles and a binder resin on a non-magnetic base film, and then subjecting the magnetic recording layer to calendering treatment.

In recent years, with further reduction in thickness of the magnetic recording layer, there has been proposed such a method of forming one undercoat layer comprising a binder resin and non-magnetic particles such as acicular hematite particles dispersed therein (hereinafter referred to as "non-magnetic undercoat layer") on a non-magnetic base film in order to solve problems such as deterioration in surface properties and electromagnetic performance of the magnetic recording layer, and magnetic recording media having such a non-magnetic undercoat layer have been already put into practice (Japanese Patent Publication (KOKOKU) No. 6-93297(1994), and Japanese Patent Application Laid-Open (KOKAI) Nos. 62-159338(1987), 63–187418(1988), 4–167225(1992), 4–325915(1992), 5–73882(1993) and 5-182177(1993)).

In the case of such magnetic recording media having the non-magnetic undercoat layer, the non-magnetic undercoat layer comprising non-magnetic particles and a binder resin, and the magnetic recording layer comprising magnetic particles and a binder resin are successively formed on the non-magnetic base film, and then the obtained medium is subjected to calendering treatment to absorb irregularities on the non-magnetic base film by the non-magnetic undercoat layer, thereby smoothening the surface of the magnetic recording layer. For example, in Japanese Patent Application Laid-Open (KOKAI) No. 5-12650(1993), it is described that "... in the case where a non-magnetic layer is provided, when the layer containing hexagonal system ferrite-based magnetic particles is subjected to surface-smoothing treatment, the non-magnetic layer formed immediately beneath the magnetic layer is collapsed as a buffer layer. At this time, the underlying non-magnetic layer acts as an absorbing layer, so that the surface of the upper magnetic recording layer containing hexagonal system ferrite-based magnetic particles can be smoothened ...".

Hitherto, in order to improve properties of magnetic recording media, various attempts for non-magnetic particles used in the non-magnetic undercoat layer have been conducted. For example, in Japanese Patent Application Laid-Open (KOKAI) No. 6-60362(1994), there is described a non-magnetic undercoat layer for magnetic recording media, which contains non-magnetic particles composed of acicular hematite particles coated with an Al compound. Also, in Japanese Patent Application Laid-Open (KOKAI) No. 10-334450(1998), there is described a magnetic recording medium having a non-magnetic undercoat layer containing fine acicular goethite particles in which three or less particles are overlapped at the same crystal planes and adhered with each other along the crystallographical a-axis direction thereof.

At present, it has been strongly required to provide acicular hematite particles as non-magnetic particles capable of forming a non-magnetic undercoat layer for a magnetic recording medium having a more excellent surface smoothness. However, such acicular hematite particles have not been obtained conventionally.

Namely, the hematite particles described in Japanese Patent Application Laid-Open (KOKAI) No. 6-60362(1994) do not have such a structure as oriented in the major axis direction thereof. Therefore, it is difficult to improve a surface smoothness of a coating film produced using such hematite particles by calendering treatment.

Also, even though the goethite particles described in Japanese Patent Application Laid-Open (KOKAI) No. 10-334450(1998) are used as non-magnetic particles for non-magnetic undercoat layer, it is difficult to attain the aimed dispersibility because of poor compatibility with binder resins or solvents due to a large amount of crystal water contained in the goethite particles.

As a result of the present inventors earnest studies, it has been found that when hematite particles aggregates having an average length of 0.005 to 0.6 µm and an average width of 0.001 to 0.40 µm, which are obtained by subjecting acicular goethite particles to milling treatment and then heat-dehydrating the treated particles at a temperature of 200 to 540, are used for forming a non-magnetic undercoat layer for magnetic recording medium, the obtained non-magnetic undercoat layer can be considerably improved in surface smoothness. The present invention has been attained on the basis of this finding.

SUMMARY OF THE INVENTION

An object of the present invention is to provide hematite particles aggregates as non-magnetic particles capable of forming a non-magnetic undercoat layer for magnetic recording medium having a more excellent surface smoothness, which can exhibit not only an excellent dispersibility but also have an improving ability of a surface smoothness of a coating film by calendering treatment.

Another object of the present invention is to provide a non-magnetic undercoat layer for magnetic recording medium having a more excellent surface smoothness, which contains the above hematite particles aggregates.

A further object of the present invention is to provide a magnetic recording medium having the non-magnetic undercoat layer, exhibiting a more excellent surface smoothness.

To accomplish the aims, in a first aspect of the present invention, there are provided hematite particles aggregates comprising aggregates of acicular hematite particles oriented in a major axis direction thereof, said acicular hematite particles having an average major axis diameter of 0.005 to 0.3 $\mu$m and an average minor axis diameter of 0.0005 to 0.10 $\mu$m, said hematite particles aggregates exhibiting a compressiblity of a coating film of 9.0 to 20.0%, when measured by the following method:
(i) 12 g of the hematite particles aggregates are mixed with a binder resin solution (containing 30% by weight of a vinyl chloride-vinyl acetate copolymer resin having a sodium sulfonate group, and 70 by weight of cyclohexanone) and cyclohexanone, thereby obtaining a mixture having solid content of 72%, and a resultant mixture is further kneaded for 30 minutes using a plast-mill to obtain a kneaded material;
(ii) the obtained kneaded material together with 95 g of 1.5 mm$\phi$ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 $\mu$m and then dried, thereby forming a non-magnetic undercoat layer; and (iv) the thus obtained dried non-magnetic undercoat layer is subjected to calendering treatment at 85° C. under a load of 200 kg/cm four times, and the compressiblity of the coating film is calculated from thicknesses to ($\mu$m) and $t_1$ ($\mu$m) of the coating film before and after the calendering treatment, respectively, according to the following formula:

Compressiblity of coating film (%)={$(t_0-t_1)/t_0$}×100 wherein $t_0$ represents a thickness of the non-magnetic undercoat layer before the calendering treatment; and $t_1$ represents a thickness of the non-magnetic undercoat layer after the calendering treatment.

In a second aspect of the present invention, there are provided hematite particles aggregates comprising aggregates of acicular hematite particles oriented in a major axis direction thereof, said acicular hematite particles having an average major axis diameter of 0.005 to 0.3 $\mu$m and an average minor axis diameter of 0.0005 to 0.10 $\mu$m, said hematite particles aggregates exhibiting a specific surface area value of 100 to 250 m$^2$/g, a cyclohexanone absorption of not less than 0.6 ml/g, a soluble sodium salt content of not more than 300 ppm calculated as Na, a soluble sulfate content of not more than 150 ppm calculated as SO$_4$, and a compressiblity of coating film of 9.0 to 20.0% when measured by the following method:
(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;
(ii) the obtained kneaded material together with 95 g of 1.5 mm$\phi$ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 $\mu$m and then dried, thereby forming a non-magnetic undercoat layer; and
(iv) the thus obtained dried non-magnetic undercoat layer is subjected to calendering treatment at 85° C. under a load of 200 kg/cm four times, and the compressiblity of the coating film is calculated from thicknesses $t_0$ ($\mu$m) and $t_1$ ($\mu$m) of the coating film before and after the calendering treatment, respectively, according to the following formula:

$$\text{Compressiblity of coating film (\%)} = \{(t_0 - t_1)/t_0\} \times 100$$

wherein $t_0$ represents a thickness of the non-magnetic undercoat layer before the calendering treatment; and $t_1$ represents a thickness of the non-magnetic undercoat layer after the calendering treatment.

In a third aspect of the present invention, there are provided hematite particles aggregates comprising aggregates of acicular hematite particles oriented in a major axis direction thereof, said acicular hematite particles having an average major axis diameter of 0.005 to 0.3 $\mu$m and an average minor axis diameter of 0.0005 to 0.10 $\mu$m.

said hematite particles aggregates having a surface-coating layer composed of at least one selected from the group consisting of hydroxides of aluminum, oxides of aluminum, hydroxides of silicon and oxides of silicon, and having a specific surface area value of 100 to 250 m$^2$/g, a cyclohexanone absorption of not less than 0.6 ml/g, a soluble sodium salt content of not more than 300 ppm calculated as Na, a soluble sulfate content of not more than 150 ppm calculated as S0$_4$, and a compressiblity of coating film of 9.0 to 20.0% when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mm$\phi$ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
| --- | --- |
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 $\mu$m and then dried, thereby forming a non-magnetic undercoat layer; and (iv) the thus obtained non-magnetic undercoat layer is subjected to calendering treatment at 85° C. under a load of 200 kg/cm four times, and the compressiblity of the coating film is calculated from thicknesses $t_0$ ($\mu$m) and $t_1$ ($\mu$m) of the coating film before and after the calendering treatment, respectively, according to the following formula:

$$\text{Compressiblity of coating film (\%)} = \{(t_0 - t_1)/t_0\} \times 100$$

wherein $t_0$ represents a thickness of the non-magnetic undercoat layer before the calendering treatment; and $t_1$ represents a thickness of the non-magnetic undercoat layer after the calendering treatment.

In a fourth aspect of the present invention, there is provided a non-magnetic base film for a magnetic recording medium comprising a non-magnetic base film, and a non-magnetic undercoat layer formed on the non-magnetic substrate which comprises the hematite particles aggregates as defined in the first aspect, and a binder resin.

In a fifth aspect of the present invention, there is provided a non-magnetic substrate for a magnetic recording medium comprising a non-magnetic base, and a non-magnetic undercoat layer formed on the non-magnetic base film which comprises the hematite particles aggregates as defined in the first aspect, and a binder resin, and exhibits a gloss of 180 to 300%, a surface roughness Ra of coating film of 0.5 to 8.0 nm, and a compressiblity of coating film of 9.0 to 20.0% when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mm$\phi$ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
| --- | --- |
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 $\mu$m and then dried, thereby forming a non-magnetic undercoat layer; and (iv) the thus obtained non-magnetic undercoat layer is subjected to calendering treatment at 85° C. under a load of 200 kg/cm four times, and the compressiblity of the coating film is calculated from thicknesses $t_0$ ($\mu$m) and $t_1$ ($\mu$m) of the coating film before and after the calendering treatment, respectively, according to the following formula:

$$\text{Compressiblity of coating film } (\%) = \{(t_0 - t_1)/t_0\} \times 100$$

wherein $t_0$ represents a thickness of the non-magnetic undercoat layer before the calendering treatment; and $t_1$ represents a thickness of the non-magnetic undercoat layer after the calendering treatment.

In a six aspect of the present invention, there is provided a magnetic recording medium comprising a non-magnetic base film, a non-magnetic undercoat layer formed on the non-magnetic base film which comprises the hematite particles aggregates as defined in the first aspect, and a binder resin, and a magnetic recording layer formed on the non-magnetic undercoat layer which comprises magnetic particles and a binder resin.

In a seventh aspect of the present invention, there is provided a magnetic recording medium comprising a non-magnetic base film, a non-magnetic undercoat layer formed on the non-magnetic base film which comprises the hematite particles aggregates as defined in the first aspect, and a binder resin; and a magnetic recording layer formed on the non-magnetic undercoat layer which comprises magnetic particles and a binder resin, and having a coercive force value of 39.8 to 318.3 kA/m (500 to 4,000 Oe), a squareness (residual magnetic Flux density Br/saturation magnetic flux density Bm) of 0.85 to 0.95, a gloss of coating film of 170 to 300%, a surface roughness Ra of coating film of not more than 8.5 nm, and a compressiblity of 7.5 to 19.0% when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mmφ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 μm and then dried, thereby forming a non-magnetic undercoat layer;

(iv) 12 g of magnetic particles are mixed with fine carbon black particles, alumina particles as an abrasive, a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 78%, and a resultant mixture is further kneaded for 30 minutes using a plast-mill to obtain a kneaded material;

(v) the obtained kneaded material together with 95 g of 1.5 mmφ glass beads, an additional amount of a binder resin solution (comprising 30% by weight of a polyurethane resin having a sodium sulfonate group, 35% by weight of toluene and 35% by weight of methyl ethyl ketone), cyclohexanone, toluene and methyl ethyl ketone, are charged into a 140-ml glass bottle at the following mixing ratio; a resultant mixture is mixed and dispersed for 6 hours using a paint shaker to obtain a coating material; the obtained coating material is further mixed with a lubricant and a curing agent: and a resultant mixture is mixed and dispersed for 15 minutes using a paint shaker, thereby obtaining a magnetic coating material:

| Composition of magnetic coating material: | |
|---|---|
| Magnetic particles | 100.0 parts by weight |
| Abrasive (alumina particles) | 10.0 parts by weight |
| Fine carbon black particles | 3.0 parts by weight |
| Vinyl chloride-vinyl acetate copolymer resin having a sodium sulfonate group | 10.0 parts by weight |
| Polyurethane resin having a sodium sulfonate group | 10.0 parts by weight |
| Lubricant (myristic acid:butyl stearate = 1:2) | 3.0 parts by weight |
| Curing agent (polyisocyanate) | 5.0 parts by weight |
| Cyclohexanone | 65.8 parts by weight |
| Methyl ethyl ketone | 164.5 parts by weight |
| Toluene | 98.7 parts by weight; |

(vi) the obtained magnetic coating material is applied onto the non-magnetic undercoat layer formed on the non-magnetic base film using an applicator with a coating thickness of 15 μm and a resultant coating film is oriented in a magnetic field and then dried, thereby obtaining a magnetic recording layer; and (vii) the thus obtained coating film is subjected to calendering treatment at 85° C. under a load of 200 kg/cm four times, and the compressiblity of the coating film is calculated from thicknesses $t_2$ (μm) and $t_3$ (μm) of the coating film before and after the calendering treatment, respectively, according to the following formula:

$$\text{Compressiblity of coating film } (\%) = \{(t_2 - t_3)/t_2\} \times 100$$

wherein $t_2$ represents a total thickness of the non-magnetic undercoat layer and the magnetic recording layer before the calendering treatment; and $t_3$ represents a total thickness of the non-magnetic undercoat layer and the magnetic recording layer after the calendering treatment.

DETAILED DESCRIPTION OF THE INVENTION

The present invention will be described in detail below.

First, the hematite particles aggregates for non-magnetic undercoat layer according to the present invention are described.

The hematite particles aggregates for non-magnetic undercoat layer according to the present invention are constituted by usually plural number of acicular hematite particles oriented along the major axis direction thereof.

The hematite particles aggregates of the present invention have an average length of usually 0.005 to 0.6 µm, preferably 0.01 to 0.45 µm, more preferably 0.02 to 0.3 µm. When the average length is more than 0.6 µm, the size of the hematite particles aggregates is too large. When such large particles are used for forming a non-magnetic undercoat layer, the obtained coating film may tend to be deteriorated in surface smoothness. When the average length is less than 0.005 µm, such particles may tend to be agglomerated together because of the increase in intermolecular force due to fine particles, resulting in poor dispersibility in vehicle upon production of a non-magnetic coating material.

The hematite particles aggregates of the present invention have an average width of usually 0.001 to 0.40 µm, preferably 0.002 to 0.30 µm, more preferably 0.004 to 0.20 µm. When the average width is less than 0.001 µm, such particles may tend to be agglomerated together because of the increase in intermolecular force due to fine particles, resulting in poor dispersibility in vehicle upon production of a non-magnetic coating material.

The hematite particles aggregates of the present invention have a ratio of average length to average width of usually 1.5:1 to 15:1, preferably 2.0:1 to 12.5:1, more preferably 2.5:1 to 10:1. When the ratio of average length to average width is more than 15:1, such particles may tend to be entangled together, resulting in poor dispersibility in vehicle upon production of a non-magnetic coating material, or to increase in viscosity thereof. When the ratio of average length to average width is less than 1.5:1, such particles may tend to be deteriorated in dispersibility in vehicle upon production of a non-magnetic coating material.

The hematite particles aggregates of the present invention have a compressiblity of coating film of usually 9.0 to 20.0%, preferably 9.5 to 20.0%, more preferably 11.0 to 20.0% as measured with respect to a non-magnetic undercoat layer produced therefrom by the following method.

(i) 12 g of hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having solid content of 72%. The resultant mixture is further kneaded for 30 minutes using a plast-mill to obtain a kneaded material.

(ii) The obtained kneaded material together with 95 g of 1.5 mmϕ glass beads, an additional binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, were charged into a 140-ml glass bottle at the following mixing ratio. The resultant mixture was mixed and dispersed for 6 hours using a paint shaker, thereby obtaining a magnetic coating material.

| Composition of magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight |

(iii) The obtained non-magnetic coating material was applied onto a non-magnetic base film using an applicator with a coating thickness of 55 µm and then dried, thereby forming a non-magnetic undercoat layer.

(iv) The thus obtained non-magnetic undercoat layer was subjected to calendering treatment at 85° C. under a load of 200 kg/cm four times. The compressiblity of the coating film was calculated from thicknesses $t_0$ (µm) and $t_1$ (µm) of the coating film before and after the calendering treatment, respectively, according to the following formula:

$$\text{Compressiblity of coating film (\%)} = \{(t_0 - t_1)/t_0\} \times 100$$

wherein $t_0$ represents a thickness of a non-magnetic undercoat layer before calendering treatment; and $t_1$ represents a thickness of a non-magnetic undercoat layer after calendering treatment.

When the non-magnetic undercoat layer has a compressiblity of coating film of less than 9.0%, it may be difficult to obtain the effect of sufficiently improving a surface smoothness of the coating film by calendering treatment. When the non-magnetic undercoat layer has a compressiblity of coating film of more than 20.0%, the thickness of the coating film is considerably fluctuated, so that it becomes difficult to design a suitable magnetic recording medium.

The hematite particles aggregates of the present invention have a BET specific surface area value of preferably 100 to 250 m²/g. When the BET specific surface area value is more than 250 m²/g, the packing condition of the particles contained in the coating film may become too dense, so that it may be difficult to attain a good surface-smoothing effect by the calendering treatment. When the BET specific surface area value is less than 100 m²/g, the obtained particles may become too coarse to sufficiently improve a surface smoothness of the coating film. In the consideration of surface smoothness of the obtained magnetic recording medium, the BET specific surface area value of the hematite particles aggregates is more preferably 100 to 225 m²/g, still more preferably 110.9 to 200 m²/g.

The hematite particles aggregates of the present invention have a cyclohexanone absorption of preferably not less than 0.6 ml/g, more preferably 0.65 to 1.5 ml/g. When the cyclohexanone absorption is less than 0.6 ml/g, it is suggested that the aggregated particles may fail to have the structure as specified in the present invention. Therefore, it may be difficult to obtain the effect of improving a surface smoothness of a coating film by calendering treatment.

In particular, in the consideration of corrosion resistance of the obtained magnetic recording medium, the hematite particles aggregates of the present invention are preferably composed of such high-purity hematite particles having a less soluble sodium salt content, a less soluble sulfate content or the like.

Specifically, the high-purity hematite particles aggregates have a soluble sodium salt content of usually not more than 300 ppm, preferably not more than 200 ppm, calculated as Na; and a soluble sulfate content of usually not more than 150 ppm, preferably not more than 100 ppm, calculated as $SO_4$.

Also, the hematite particles aggregates of the present invention preferably have a pH value of usually not less than 8.0, preferably 8.2 to 11.0.

The hematite particles aggregates of the present invention may be coated, if required, with at least one surface-coating material selected from the group consisting of hydroxides of aluminum, oxides of aluminum, hydroxides of silicon and oxides of silicon. The thus surface-coated hematite particles aggregates can show a good compatibility with a binder resin when dispersed in vehicle, thereby readily attaining the aimed dispersibility.

The amount of the surface-coating material applied, i.e., a hydroxides and/or oxides of aluminum and/or silicon coat, is preferably 0.01 to 50% by weight, calculated as Al for hydroxides of aluminum or oxides of aluminum, and calculated as $SiO_2$ for hydroxides of silicon or oxides of silicon, base on the weight of the hematite particles aggregates. When the amount of the surface-coating material applied is less than 0.01% by weight, the effect of improving the dispersibility can not achieved. When the amount of the surface-coating material applied is more than 50% by weight, the effect obtained by the coating is already saturated and, therefore, it is unnecessary and meaningless to use such a large coating amount. In the consideration of the effect of improving the dispersibility and industrial productivity, the amount of the surface-coating material applied is more preferably 0.05 to 20% by weight.

In the case where the aluminum and silicon compounds are used in combination, the amount of the surface-coating material applied is preferably 0.01 to 50% by weight, more preferably 0.05 to 20% by weight (calculated as a sum of Al and $SiO_2$) based on the weight of the hematite particles aggregates.

The hematite particles aggregates constituted by hematite particles coated with the surface-coating material have substantially the same particle length, particle width, ratio of average length to average width and BET specific surface area value as those of the hematite particles aggregates constituted by hematite particles uncoated with the surface-coating material.

The acicular hematite particles used in the present invention have an average major axis diameter of 0.005 to 0.3 $\mu$m, preferably 0.008 to 0.25 $\mu$m, more preferably 0.01 to 0.2 $\mu$m.

When the average major axis diameter of the acicular hematite particles is more than 0.3 $\mu$m, the size of the obtained particles may become too large. As a result, when such large particles are used, the obtained non-magnetic undercoat layer may tend to be deteriorated in surface smoothness. When the average major axis diameter of the acicular hematite particles is less than 0.005 $\mu$m, such particles may tend to be agglomerated together because of the increase in intermolecular force due to fine particles, thereby failing to obtain aggregated particles oriented along the same direction.

The acicular hematite particles used in the present invention have an average minor axis diameter of 0.0005 to 0.1 $\mu$m, preferably 0.0006 to 0.05 $\mu$m, more preferably 0.0007 to 0.02 $\mu$m.

When the average minor axis diameter of the acicular hematite particles is less than 0.0005 $\mu$m, such particles may tend to be agglomerated together because of the increase in intermolecular force due to fine particles, thereby failing to obtain aggregated particles oriented along the major axis direction. The acicular hematite particles having an average minor axis diameter of more than 0.1 $\mu$m are difficult to industrially produce.

The acicular hematite particles used in the present invention have a ratio of an average major axis diameter to an average minor axis diameter (hereinafter referred to merely as "aspect ratio") of 3:1 to 30:1, preferably 5:1 to 28:1, more preferably 10:1 to 25:1.

When the aspect ratio is less than 3:1 or more than 30:1, the obtained non-magnetic undercoat layer exhibits a low strength.

The acicular hematite particles used in the present invention may contain aluminum inside thereof. By using the acicular hematite particles containing aluminum inside thereof, the obtained magnetic recording medium can exhibit an improved durability. The amount of aluminum contained inside of the acicular hematite particles is preferably 0.05 to 50% by weight, more preferably 0.05 to 40% by weight, calculated as Al.

Next, the magnetic recording medium of the present invention is described.

The magnetic recording medium of the present invention comprises a non-magnetic base film, a non-magnetic undercoat layer formed on the non-magnetic base film, and a magnetic recording layer formed on the non-magnetic undercoat layer.

As the non-magnetic base film, there may be used those presently used in ordinary magnetic recording media, e.g., films of synthetic resins such as polyethylene terephthalate, polyethylene, polypropylene, polycarbonates, polyethylene naphthalate, polyamides, polyamideimides and polyimides, foils and plates of metals such as aluminum and stainless steel, and various papers. The thickness of the non-magnetic base film may be varied depending upon materials thereof, and is preferably 1.0 to 300 $\mu$m, more preferably 2.0 to 200 $\mu$m.

More specifically, in the case of magnetic discs, a non-magnetic base film thereof may be usually made of polyethylene terephthalate, and has a thickness of usually 50 to 300 $\mu$m, preferably 60 to 200 $\mu$m. In the case of magnetic tapes, a non-magnetic base film thereof may be made of polyethylene terephthalate, polyethylene naphthalate, polyamides or the like; and the polyethylene terephthalate for magnetic tapes has a thickness of usually 3 to 100 $\mu$m, preferably 4 to 20 $\mu$m; the polyethylene naphthalate has a thickness of usually 3 to 50 $\mu$m, preferably 4 to 20 $\mu$m; and the polyamide has a thickness of usually 2 to 10 $\mu$m, preferably 3 to 7 $\mu$m.

The non-magnetic undercoat layer of the present invention comprises a binder resin, and the hematite particles aggregates of the present invention, or the hematite particles aggregates coated with the surface-coating material according to the present invention.

As the binder, there may be used those presently used for the production of ordinary magnetic recording media, e.g., vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivatives such as nitrocellulose, etc., polyester resin, synthetic rubber-based resin such as polybutadiene, etc., epoxy resin, polyamide resin, polyisocyanate, electron beam-curable acrylic urethane resin, or mixtures thereof. Also, the binder resin may contain polar groups such as —OH, —COOH, —$SO_3M$, —$OPO_2M_2$ and —$NH_2$ wherein M represents hydrogen, sodium or potassium. In the consideration of dispersibility of the hematite particles aggregates in vehicle, it is preferred to use the binder resins containing —COOH or —SO$_3$M as a polar group.

The amount of the hematite particles aggregates contained in the non-magnetic undercoat layer is usually 5 to 2,000 parts by weight, preferably 100 to 1,000 parts by weight based on 100 parts by weight of the binder resin.

When the amount of the hematite particles aggregates used is less than 5 parts by weight, the amount of the hematite particles aggregates contained in a non-magnetic coating material is too small. As a result, upon producing a coating film from such a non-magnetic coating material, it may be difficult to obtain a layer containing the hematite particles aggregates continuously dispersed therein, resulting in insufficient surface smoothness and strength of the obtained coating film. When the amount of the hematite particles aggregates used is more than 2,000 parts by weight, the amount of the hematite particles aggregates used may be too large as compared to the amount of the binder resin used. As a result, it may be difficult to sufficiently disperse the hematite particles aggregates in the non-magnetic coating material, thereby failing to obtain a coating film having a sufficient surface smoothness. Further, the hematite particles aggregates may not be sufficiently bonded together by the binder resin, thereby failing to obtain a stable coating film.

The thickness of the non-magnetic undercoat layer formed on the non-magnetic base film is preferably 0.2 to 10 μm. When the thickness of the non-magnetic undercoat layer is less than 0.2 μm, it may be difficult to improve the surface roughness of the non-magnetic base film, and the obtained coating film may tend to become insufficient in strength. In the consideration of reduction in thickness of the obtained magnetic recording medium and strength of the coating film, the thickness of the non-magnetic undercoat layer is more preferably 0.5 to 5 μm.

Meanwhile, the non-magnetic undercoat layer may further contain various additives used for the production of ordinary magnetic recording media such as lubricants, abrasives, anti-static agents and the like.

The non-magnetic undercoat layer using the hematite particles aggregates according to the present invention has a gloss of coating film of usually 180 to 300%, and a surface roughness Ra of coating film of usually 0.5 to 8.0 nm. As to the strength of the coating film, the non-magnetic undercoat layer has a Young's modulus (relative value) of usually 126 to 160, and a compressiblity of coating film of usually of 9.0 to 20.0%, preferably 11.0 to 20.0%.

The non-magnetic undercoat layer using the hematite particles aggregates uncoated with the above surface-coating material according to the present invention has a gloss of coating film of usually 180 to 300%, preferably 185 to 300%, and a surface roughness Ra of coating film of usually 0.5 to 8.0 nm, preferably 0.5 to 7.5 nm. As to the strength of the coating film, the non-magnetic undercoat layer has a Young's modulus (relative value) of 126 to 160, preferably 128 to 160, and a compressiblity of coating film of usually 9.0 to 20.0%, preferably 9.5 to 19.0%, more preferably 10.0 to 18.0%.

The non-magnetic undercoat layer using the hematite particles aggregates coated with the above surface-coating material according to the present invention has a gloss of coating film of usually 185 to 300%, preferably 190 to 300%, and a surface roughness Ra of coating film of usually 0.5 to 7.5 nm, preferably 0.5 to 7.0 nm. As to the strength of the coating film, the non-magnetic undercoat layer has a Young's modulus (relative value) of usually 128 to 160, preferably 130 to 160, and a compressiblity of coating film of usually 9.5 to 20.0%, preferably 10.0 to 19.0%, more preferably 10.5 to 18.0%.

The magnetic recording medium of the present invention Comprises magnetic particles and a binder resin.

As the magnetic particles, there may be used cobalt-coated magnetic iron oxide particles obtained by coating with Co, or Co and Fe, on magnetic iron oxide particles such as maghemite particles ($\gamma$-Fe$_2$O$_3$); and magnetite particles (FeO$_x$·Fe$_2$O$_3$, 0<x≦1), cobalt-coated magnetic iron oxide particles obtained by incorporating other elements than Fe such as Co, Al, Ni, P, Zn, Si, B and rare earth metals into the above cobalt-coated magnetic iron oxide particles; acicular magnetic metal particles containing iron as a main component; acicular magnetic iron alloy particles containing other elements than Fe such as Co, Al, Ni, P, Zn, Si, B and rare earth metals; magnetoplumbite-type plate-shaped ferrite particles containing Ba, Sr or Ba—Sr; magnetoplumbite-type plate-shaped ferrite particles obtained by incorporating into the above magnetoplumbite-type plate-shaped ferrite particles, one or more coercive force reducing agents selected from the group consisting of divalent and tetravalent metals such as Co, Ni, Zn, Mn, Mg, Ti, Sn, Zr, Nb, Cu and Mo, or the like.

In the consideration of recent short-wavelength recording and high-density recording, among the above magnetic particles, acicular magnetic metal particles containing iron as a main component, and acicular magnetic iron alloy particles containing other elements than Fe such as Co, Al, Ni, P, Zn, Si, B and rare earth metals, are preferred.

The magnetic particles have an average major axis diameter (average plate surface diameter in the case of plate-shaped particles) of usually 0.01 to 0.5 μm preferably 0.03 to 0.3 μm. The magnetic particles are preferably acicular particles or plate-shaped particles. Here, the "acicular" shape means in addition to literally an acicular shape, a spindle shape and a rice-ball shape.

The acicular magnetic particles have an aspect ratio of usually not less than 3:1, preferably not less than 5:1. In the consideration of dispersibility in vehicle, the upper limit of the aspect ratio of the acicular magnetic particles is usually 15:1, preferably 10:1.

The plate-shaped magnetic particles have a ratio of an average plate surface diameter to an average thickness (hereinafter referred to merely as "plate ratio") of usually not less than 2:1, preferably not less than 3:1. In the consideration of dispersibility in vehicle, the upper limit of the plate ratio of the plate-shaped magnetic particles is usually 50:1, preferably 45:1.

As to the magnetic properties of the magnetic particles, the coercive force value thereof is usually 39.8 to 318.3 kA/m (500 to 4,000 Oe), preferably 43.8 to 318.3 kA/m (550 to 4,000 Oe); and the saturation magnetization value thereof is usually 50 to 170 Am$^2$/kg (50 to 170 emu/g), preferably 60 to 170 Am$^2$/kg (60 to 170 emu/g).

In the consideration of high-density recording, etc., the it is preferred to use the acicular magnetic metal particles containing iron as a main component or the acicular magnetic iron alloy particles. As to the magnetic properties of the acicular magnetic metal particles containing iron as a main component or the acicular magnetic iron alloy particles, the coercive force value thereof is usually 63.7 to 278.5 kA/m (800 to 3,500 Oe), preferably 71.6 to 278.5 kA/m (900 to 3,500 Oe); and the saturation magnetization value thereof is usually 90 to 170 Am$^2$/kg (90 to 170 emu/g), preferably 100 to 170 Am$^2$/kg (100 to 170 emu/g).

As the binder resin for the magnetic recording layer, there may be used the same binder resins as used for Forming the above non-magnetic undercoat layer.

The thickness of the magnetic recording layer formed on the non-magnetic undercoat layer is usually 0.01 to 5 μm, preferably 0.05 to 1 μm. When the thickness of the magnetic recording layer is less than 0.01 μm, it may be difficult to form a uniform coating film, resulting in problems such as coating unevenness or the like. When the thickness of the magnetic recording layer is more than 5 μm, the obtained magnetic recording layer may fail to show the aimed electromagnetic performance because of influence of demagnetizing field.

The amount of the magnetic particles contained in the magnetic recording layer is usually 200 to 2,000 parts by weight, preferably 300 to 1,500 parts by weight based on 100 parts by weight of the binder resin.

The magnetic recording layer may further contain ordinarily used additives such as lubricants, abrasives, anti-static agents or the like.

The magnetic recording medium of the present invention has a coercive force value of 39.8 to 318.3 kA/m (500 to 4,000 Oe); a squareness (residual magnetic flux density Br/saturation magnetic flux density Bm) of usually 0.85 to 0.95; a gloss of coating film of usually 170 to 300%; a surface roughness Ra of a coating film of usually not more than 8.5 nm; a Young's modulus (relative value) of usually 128 to 160; and a compressiblity of coating film of usually 7.5 to 19.0% when as measured with a coating film comprising the non-magnetic undercoat layer and the magnetic layer.

The magnetic recording medium produced using the above magnetic particles as magnetic particles for magnetic recording layer, and the hematite particles aggregates uncoated with the surface-coating material as non-magnetic particles for non-magnetic undercoat layer according to the present invention, has a coercive force value of 39.8 to 318.3 kA/m (500 to 4,000 Oe), preferably 43.8 to 318.3 kA/m (550 to 4,000 Oe); a squareness (residual magnetic flux density Br/saturation magnetic flux density Bm) of usually 0.85 to 0.95, preferably 0.86 to 0.95; a gloss of coating film of usually 170 to 300%, preferably 175 to 300%; a surface roughness Ra of a coating film of usually not more than 8.5 nm, preferably 2.0 to 8.0 nm; a Young's modulus (relative value) of usually 128 to 160, preferably 130 to 160; and a compressiblity of coating film of usually 7.5 to 19.0%, preferably 8.0 to 18.0%, more preferably 8.5 to 17.0% when as measured with a coating film comprising the non-magnetic undercoat layer and the magnetic layer.

The magnetic recording medium produced using the above magnetic for magnetic recording layer, and the hematite particles aggregates coated with the surface-coating material as non-magnetic particles for non-magnetic undercoat layer according to the present invention, has a coercive force value of 39.8 to 318.3 kA/m (500 to 4,000 Oe), preferably 43.8 to 318.3 kA/m (550 to 4,000 Oe); a squareness (residual magnetic flux density Br/saturation magnetic flux density Bm) of usually 0.85 to 0.95, preferably 0.86 to 0.95; a gloss of coating film of usually 175 to 300%, preferably 180 to 300%; a surface roughness Ra of a coating film of usually not more than 8.0 nm, preferably 2.0 to 7.5 nm; a Young's modulus (relative value) of usually 130 to 160, preferably 132 to 160; and a compressiblity of coating film of usually 8.0 to 19.0%, preferably 8.5 to 18.0%, more preferably 9.0 to 17.0% when as measured with a coating film comprising the non-magnetic undercoat layer and the magnetic layer.

In the consideration of high-density recording, etc. of the magnetic recording medium, it is suitable that the acicular magnetic metal particles containing iron as a main component or the acicular magnetic iron alloy particles are used as magnetic particles for magnetic recording layer, and the hematite particles aggregates uncoated with the surface-coating material are used as non-magnetic particles for non-magnetic undercoat layer. Such a magnetic recording medium has a coercive force value of 63.7 to 278.5 kA/m (800 to 3,500 Oe), preferably 71.6 to 278.5 kA/m (900 to 3,500 Oe); a squareness (residual magnetic flux density Br/saturation magnetic flux density Bm) of usually 0.87 to 0.95, preferably 0.88 to 0.95; a gloss of coating film of usually 200 to 300%, preferably 205 to 300%; a surface roughness Ra of a coating film of usually not more than 7.5 nm, preferably 2.0 to 7.5 nm; a Young's modulus (relative value) of usually 128 to 160, preferably 130 to 160; and a compressiblity of coating film of usually 7.5 to 19.0%, preferably 8.0 to 18.0%, more preferably 8.5 to 17.0% when as measured with a coating film comprising the non-magnetic undercoat layer and the magnetic layer.

The magnetic recording medium produced by using the acicular magnetic metal particles containing iron as a main component or the acicular magnetic iron alloy particles as magnetic particles for magnetic recording layer, and the hematite particles aggregates coated with the surface-coating material as non-magnetic particles for non-magnetic undercoat layer, has a coercive force value of 63.7 to 278.5 kA/m (800 to 3,500 Oe), preferably 71.6 to 278.5 kA/m (900 to 3,500 Oe); a squareness (residual magnetic flux density Br/saturation magnetic flux density Bm) of usually 0.87 to 0.95, preferably 0.88 to 0.95; a gloss of coating film of usually 205 to 300%, preferably 210 to 300%; a surface roughness Ra of a coating film of usually not more than 7.0 nm, preferably 2.0 to 6.5 nm; a Young's modulus (relative value) of usually 130 to 160, preferably 132 to 160; and a compressiblity of coating film of usually 8.0 to 19.0%, preferably 8.5 to 18.0%, more preferably 9.0 to 17.0% when as measured with a coating film comprising the non-magnetic undercoat layer and the magnetic layer.

In addition, the magnetic recording medium produced using the hematite particles aggregates composed of acicular hematite particles containing aluminum inside thereof according to the present invention as non-magnetic particles for non-magnetic undercoat layer, can be improved in durability. Specifically, as to the durability of such a magnetic recording medium, the running durability thereof is usually not less than 20 minutes, preferably not less than 22 minutes; and the scratch resistance thereof is usually rank A or B, preferably rank A.

In particular, in the case of the magnetic recording medium produced by using the acicular magnetic metal particles containing iron as a main component or the acicular magnetic iron alloy particles as magnetic particles for magnetic recording layer, and the high-purity hematite particles aggregates according to the present invention as non-magnetic particles for non-magnetic undercoat layer, the corrosion resistance as represented by the change percentage (%) of coercive force value of the magnetic recording medium thereof is usually not more than 10.0%, preferably not more than 9.5%; and the corrosion resistance as represented by the change percentage (%) of saturation magnetization thereof is usually not more than 10.0%, preferably not more than 9.5%.

Next, the process for producing the hematite particles aggregates according to the present invention, is described.

The hematite particles aggregates according to the present invention can be produced by subjecting acicular goethite particles to milling treatment, and then heat-dehydrating the treated acicular goethite particles at a temperature of usually 200 to 540° C.

The acicular goethite particles used in the present invention can be produced by passing an oxygen-containing gas such as air through a suspension containing an iron hydroxide obtained by reacting ferrous salt with an aqueous alkali hydroxide solution.

The acicular goethite particles used in the present invention preferably have an average major axis diameter of usually 0.005 to 0.35 µm, an average minor axis diameter of usually 0.0005 to 0.12 µm, an aspect ratio of usually 3:1 to 30:1, and a BET specific surface area value of usually 100 to 250 m$^2$/g.

Meanwhile, the surface of the acicular goethite particles used in the present invention may be coated, if required, with an anti-sintering agent containing P, Si, B, Zr, Sb or the like.

Upon the above milling treatment of the acicular goethite particles, there may be used a water suspension obtained by subjecting a suspension containing the goethite particles produced by the goethite production reaction to filtering-out and water-washing, and then dispersing again the goethite particles wet-cake in water; or a water suspension obtained by subjecting a suspension containing goethite particles produced by the goethite production reaction to filtering-out, water-washing and drying to taken out goethite particles, and then dispersing again the goethite particles in water. Among these water suspensions, it is preferred to use the water suspension obtained by dispersing again the goethite particles wet-cake in water.

The milling treatment of the acicular goethite particles may be conducted by adjusting the concentration of the slurry containing the acicular goethite particles to usually 30 to 500 g/liter, preferably 40 to 250 g/liter, more preferably 50 to 200 g/liter, and then subjecting the obtained slurry to milling treatment by applying a shear force of usually 1,000 to 9,000 rpm, preferably 1,200 to 5,000 rpm thereto. This milling treatment causes the acicular goethite particles to orient in the major axis direction thereof.

As apparatuses usable for subjecting the acicular goethite particles to milling treatment, there may be used those apparatuses capable of applying a suitable shear force to the slurry, for example, wet-grinding apparatuses such as grinders and ultrafine-pulverizers.

Specific examples of the wet-grinding apparatuses may include SUPER MASUCOLLOTIDER and SELENDEPUTER (manufactured by Masuko Sangyo Co., Ltd.), T.K. MYCOLLOIDER (manufactured by Tokushu Kika Kogyo Co., Ltd.) or the like.

Then, the treated acicular goethite particles are heat-treated at a temperature of usually 200 to 540° C., preferably 250 to 500° C., more preferably 280 to 450° C., thereby obtaining aggregates of the acicular hematite particles. When the heat-treating temperature is less than 200° C., it may take a too long period of time until the dehydration reaction is completed. When the heat-treating temperature is more than 540° C., the dehydration reaction may abruptly proceed, resulting in destruction of shape of the obtained particles, or the obtained particles may suffer from sintering therebetween. Also, the heat-treating time is preferably in the range of 30 minutes to 3 hours.

The high-purity hematite particles aggregates can be obtained by further heat-treating the aggregates of hematite particles obtained after the above milling treatment and heat-treatment, in an aqueous alkali solution, and then filtering out and water-washing the heat-treated particles.

The pH value of the aqueous alkali solution is preferably not less than 13.0, and the heat-treating temperature is preferably not less than 80° C., more preferably not less than 90° C.

The hematite particles aggregates coated with the surface-coating material according to the present invention, can be produced by (i) adding an aluminum compound and/or a silicon compound to a water suspension containing the aggregates of hematite particles obtained after the above milling treatment and heat-treatment, and then mixing the resultant mixture under stirring, and, if required, further adjusting the pH value of the mixture obtained after the mixing, thereby coating the surface of the hematite particles aggregates with at least one compound selected from the group consisting of hydroxides of aluminum, oxides of aluminum, hydroxides of silicon and oxides of silicon, and then (ii) subjecting the obtained coated hematite particles aggregates to filtering-out, water-washing, drying and pulverizing treatments. The thus obtained hematite particles aggregates may be further subjected to deaeration, compaction or other treatments.

Examples of the aluminum compound may include aluminum salts such as aluminum acetate, aluminum sulfate, aluminum, chloride and aluminum nitrate; alkali aluminates such as sodium aluminate; or the like. Examples of the silicon compound may include water glass #3, sodium orthosilicate, sodium metasilicate or the like.

Next, the process for producing the magnetic recording medium of the present invention is described.

The magnetic recording medium of the present invention can be produced by ordinary methods, i.e., by applying a non-magnetic coating material containing the hematite particles aggregates, a binder resin and a solvent onto a non-magnetic base film, and drying the obtained coating layer, thereby forming a non-magnetic undercoat layer; applying a magnetic coating material containing magnetic particles, a binder resin and a solvent onto the thus obtained non-magnetic undercoat layer, thereby forming a magnetic recording layer; and then subjecting the thus formed magnetic recording layer to magnetic orientation, subjecting to calendering treatment and then curing.

As the solvent used for forming the non-magnetic undercoat layer or the magnetic recording layer, there may be exemplified those solvents ordinarily used for production of magnetic recording media, such as methyl ethyl ketone, toluene, cyclohexane, methyl isobutyl ketone, tetrahydroturan and mixtures thereof.

The total amount of the solvent used is 50 to 1,000 parts by weight based on 100 parts by weight of the hematite particles aggregates or magnetic particles. When the amount of the solvent used is less than 50 parts by weight, the obtained coating material may exhibit a too high viscosity, so that it may be difficult to coat such a high-viscous coating material. When the amount of the solvent used is more than 1,000 parts by weight, the amount of the solvent vaporized from the coating material may be too large and, therefore, disadvantageous from industrial viewpoint.

The point of the present invention is that the magnetic recording medium having a non-magnetic undercoat layer using the hematite particles aggregates of the present invention can exhibit an excellent surface smoothness.

The reason why the magnetic recording medium having a non-magnetic undercoat layer using the hematite particles aggregates of the present invention can exhibit an excellent surface smoothness, is considered as follows, though not clearly determined yet.

That is, since the acicular hematite particles used in the present invention are fine particles, such fine particles are usually difficult to disperse in vehicle because these particles tend to be agglomerated together by the increase in intermolecular force due to the fine particles. On the contrary, in the case of the hematite particles aggregates of the present invention, the raw acicular goethite particles are previously oriented in the major axis direction thereof and then heat-treated at such a temperature that the particles are free from sintering therebetween and destruction of the oriented condition. As a result, the thus obtained hematite particles aggregates are constituted by the acicular hematite particles oriented in the major axis direction thereof, and can maintain the oriented condition until the calendering treatment of the coating film. For this reason, it is considered that such hematite particles aggregates can be readily dispersed in vehicle because of large particle size in vehicle, and can be compressed in the thickness direction of the coating film and readily oriented in the same direction therein by subjecting the coating film to calendering treatment, thereby obtaining a magnetic recording medium having a more excellent surface smoothness.

Thus, when the hematite particles aggregates for non-magnetic undercoat layer according to the present invention are used, it is possible to obtain a non-magnetic undercoat layer having an excellent surface smoothness. Therefore, when such a non-magnetic undercoat layer is used, it is possible to produce a magnetic recording medium capable of exhibiting an excellent surface smoothness.

Further, the magnetic recording medium of the present invention can exhibit an excellent surface smoothness as described above and, therefore is suitable as a high-density magnetic recording medium.

EXAMPLES

The present invention is described in more detail by Examples and Comparative Examples, but the Examples are only illustrative and, therefore, not intended to limit the scope of the present invention thereto.

Various properties were measured by the following methods.

(1) The average major axis diameter and average minor axis diameter of acicular hematite particles and magnetic particles are respectively expressed by the average values of major axis diameters and minor axis diameters of about 350 particles observed on an enlarged photograph obtained by magnifying an electron micrograph (×30,000) four times in each of longitudinal and transverse directions.

In addition, the average length and average width of hematite particles aggregates were measured using the above electron microscope. Also, it was observed that a plural number of acicular hematite particles was oriented in the major axis direction thereof.

(2) The aspect ratio of acicular hematite particles and magnetic particles was expressed by the ratio of the average major axis diameter to the average minor axis diameter as measured above, and the plate ratio thereof is expressed by the ratio of average plate surface diameter to average thickness.

(3) The specific surface areas of acicular hematite particles and hematite particles aggregates were expressed by the values measured by a BET method.

(4) The cyclohexanone absorption of hematite particles aggregates was determined as follows. That is, 1.0 g of sample particles were placed in a round bottom flask with a plug. Cyclohexanone was slowly dropped through a burette into the flask, and then the flask was shaken to absorb cyclohexanone into the sample particles. At the time at which the sample particles became massive and cyclohexanone was no longer absorbed therein, the amount of cyclohexanone dropped was measured, and the measured value was determined as a cyclohexanone absorption of the hematite particles aggregates.

(5) The amounts of Al and Si present within hematite particles aggregates or magnetic particles, or on the surface thereof, and the amounts of Si and P of anti-sintering agent were respectively measured by a fluorescent X-ray spectroscopy device "3063 M-Model" (manufactured by Rigaku Denki Kogyo Co., Ltd.) according to JIS K0119 "General rule of fluorescent X-ray analysis".

(6) The pH value of particles was determined as follows. That is, 5 g of sample particles were weighed and placed in a conical flask. 100 ml of boiling pure water was added to the flask, and the contents of the flask were heated and kept in boiling state for about 5 minutes. Then, the flask was plugged and the contents thereof were allowed to stand until cooling to ordinary temperature. Water was added to the flask in an amount corresponding to amount of water evaporated from the flask. The flask was plugged again and shaken for one minute to mix the contents together. After allowing the obtained supernatant to stand for 5 minutes, the pH thereof was measured according to JIS Z 8802-7, and the measured pH value was determined as the pH value of the particles.

(7) The soluble sodium salt content and the soluble sulfate content were measured by passing the supernatant prepared for the above pH measurement, through a filter paper No. 5C, thereby obtaining a filtrate. The obtained filtrate was measured by an inductively coupled high-frequency plasma atomic emission spectroscope (manufactured by Seiko Denshi Kogyo Co., Ltd.) to determine concentrations of $Na^+$ and $SO_4^{2-}$ therein.

(8) The viscosity of coating material is expressed by the value obtained by measuring the viscosity of the coating material at 25° C. and a shear rate (D) of 1.92 $sec^{-1}$ using an E-type viscometer EMD-R (manufactured by Tokyo Keiki Co., Ltd.).

(9) The gloss of non-magnetic undercoat layer and magnetic recording layer was determined by measuring the 45° gloss of surface of each coating film using a gloss meter "UGV-5D" (manufactured by Suga Testing Machines Manufacturing Co., Ltd.).

(10) The surface roughness Ra of non-magnetic undercoat layer and magnetic recording layer was determined by measuring a center line average roughness of the coating film using a surface roughness tester "SurFcom-575A" (manufactured by Tokyo Seimitsu Co., Ltd.).

(11) The strength of non-magnetic undercoat layer and magnetic recording layer was expressed by a Young's modulus thereof measured using "AUTOGRAPH" (manufactured by Shimadzu Seisakusho Co., Ltd.). Specifically, the strength of the coating film was expressed by a relative value of the Young's modulus obtained by comparing the measured Young's modulus value with that of a commercially available video tape "AV T-120" (manufactured by Nihon Victor Co., Ltd.). The higher the relative value, the higher the strength of the coating film.

(12) The thicknesses of non-magnetic base film, non-magnetic undercoat layer and magnetic recording layer of the magnetic recording medium were measured by the following method.

That is, the thickness (A) of the non-magnetic base film was first measured using a digital electron micrometer "K-351C" (manufactured by Anritsu Denki Co., Ltd.). Then, the thickness (B) of the non-magnetic base film with the non-magnetic undercoat layer formed thereon (i.e., the total thickness of the non-magnetic base film and the non-magnetic undercoat layer) was measured by the same method as above. Further, the thickness (c) of the magnetic recording medium produced by forming the magnetic recording layer on the non-magnetic undercoat layer (i.e., the total thickness of the non-magnetic base film, the non-magnetic undercoat layer and the magnetic recording layer) was measured by the same method as above. The thicknesses of the non-magnetic undercoat layer and the magnetic recording layer were expressed by the values calculated from the following formulae; (B)–(A) and (C)–(B), respectively.

(13) The magnetic properties of magnetic particles and magnetic recording medium were measured using a vibration sample magnetometer "VSM-3S-15" (manufactured by Toei Kogyo Co., Ltd.) by applying an external magnetic field of 795.8 kA/m (10 kOe) thereto.

(14) The running durability of magnetic recording medium was evaluated by measuring an actual operable time thereof under a load of 1.96 N (200 gw) by setting a relative velocity between a head and a tape to 16 m/second using a media durability tester "MDT-3000" (manufactured by Steinberg Associates Co., Ltd.). The longer the actual operable time, the more excellent the running durability.

(15) The scratch resistance of magnetic recording medium was evaluated by visually observing the surface of a tape after the running durability test by a microscope to determine whether or not any scratches were caused thereon, and classifying the observation results into the following four ranks.

A: No scratches were recognized;

B: Slight amount of scratches were recognized;

C: Some scratches were recognized; and

D: Severe scratches were recognized.

(16) The change in magnetic properties of magnetic recording medium with the passage of time due to corrosion of magnetic metal particles containing iron as a main component in the magnetic recording layer, was determined as follow. That is, after the magnetic recording medium was allowed to stand at 60° C. and a relative humidity of 90% for 14 days, the coercive force value and saturation magnetic flux density value thereof were measured. The change percentage of magnetic properties of the magnetic recording medium was expressed by the value (%) obtained by dividing the difference between the coercive force values before and after the standing test, and the difference between the saturation magnetic flux density values measured before and after the standing test by the respective values measured before the standing test.

(17) The compressiblity of coating film of a non-magnetic undercoat layer was measured by the following method.

(i) 12 g of hematite particles aggregates were mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having solid content of 72%. The resultant mixture was further kneaded for 30 minutes using a plast-mill to obtain a kneaded material.

(ii) The obtained kneaded material together with 95 g of 1.5 mmφ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1;1), cyclohexanone, methyl ethyl ketone and toluene, were charged into a 140-ml glass bottle at the following mixing ratio. The resultant mixture was mixed and dispersed for 6 hours using a paint shaker, thereby obtaining a non-magnetic coating material.

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight |

(iii) Then, the obtained non-magnetic coating material was applied onto a non-magnetic base film using an applicator with a coating thickness of 55 μm and then dried, thereby forming a non-magnetic undercoat layer.

(iv) The thus obtained dry non-magnetic undercoat layer was subjected to calendering treatment at 85° C. under a load of 200 kg/cm four times. The compressiblity of the coating film was calculated from thicknesses $t_0$ (μm) and $t_1$ (μm) of the coating film before and after the calendering treatment, respectively, according to the following formula:

$$\text{Compressiblity of coating film }(\%)=\{(t_0-t_1)/t_0\}\times 100$$

wherein $t_0$ represents a thickness of the non-magnetic undercoat layer before calendering treatment; and $t_1$ represents a thickness of the non-magnetic undercoat layer after calendering treatment.

(18) The compressiblity of a coating film constituted by the non-magnetic undercoat layer and the magnetic recording layer was measured by the following method.

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mmφ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having | 10 parts by weight |

-continued

| Composition of non-magnetic coating material: | |
|---|---|
| a sodium sulfonate group | |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 μm and then dried, thereby forming a non-magnetic undercoat layer;

(iv) 12 g of magnetic particles are mixed with fine carbon black particles, alumina particles as an abrasive, a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 78%, and a resultant mixture is further kneaded for 30 minutes using a plast-mill to obtain a kneaded material;

(v) the obtained kneaded material together with 95 g of 1.5 mmφ glass beads, an additional amount of a binder resin solution (comprising 30% by weight of a polyurethane resin having a sodium sulfonate group, 35% by weight of toluene and 35% by weight of methyl ethyl ketone), cyclohexanone, toluene and methyl ethyl ketone, are charged into a 140-ml glass bottle at the following mixing ratio; a resultant mixture is mixed and dispersed for 6 hours using a paint shaker to obtain a coating material; the obtained coating material is further mixed with a lubricant and a curing agent: and a resultant mixture is mixed and dispersed for 15 minutes using a paint shaker, thereby obtaining a magnetic coating material:

| Composition of magnetic coating material: | |
|---|---|
| Magnetic particles | 100.0 parts by weight |
| Abrasive (alumina particles) | 10.0 parts by weight |
| Fine carbon black particles | 3.0 parts by weight |
| Vinyl chloride-vinyl acetate copolymer resin having a sodium sulfonate group | 10.0 parts by weight |
| Polyurethane resin having a sodium sulfonate group | 10.0 parts by weight |
| Lubricant (myristic acid:butyl stearate = 1:2) | 3.0 parts by weight |
| Curing agent (polyisocyanate) | 5.0 parts by weight |
| Cyclohexanone | 65.8 parts by weight |
| Methyl ethyl ketone | 164.5 parts by weight |
| Toluene | 98.7 parts by weight; |

(vi) the obtained magnetic coating material is applied onto the non-magnetic undercoat layer formed on the non-magnetic base film using an applicator with a coating thickness of 15 μm and a resultant coating film is oriented in a magnetic field and then dried, thereby obtaining a magnetic recording layer; and (vii) the thus obtained coating film is subjected to calendering treatment at 85° C. under a load of 200 kg/cm four times, and the compressiblity of the coating film is calculated from thicknesses $t_2$ (μm) and $t_3$ (μm) of the coating film before and after the calendering treatment, respectively, according to the following formula:

Compressiblity of coating film (%)=$\{(t_2-t_3)/t_2\} \times 100$ wherein $t_2$ represents a total thickness of the non-magnetic undercoat layer and the magnetic recording layer before the calendering treatment; and $t_3$ represents a total thickness of the non-magnetic undercoat layer and the magnetic recording layer after the calendering treatment.

Example 1

<Production of Hematite Particles Aggregates>

692 g of water glass #3 (equivalent to 1% by weight (calculated as $SiO_2$) based on the weight of acicular goethite particles) was added to a water suspension containing 20 kg of acicular goethite particles (average major axis diameter: 0.170 μm; average minor axis diameter: 0.0090 μm; aspect ratio: 18.9:1; inside aluminum content: 1.80% by weight based on the weight of acicular goethite particles), which was prepared by dispersing a acicular goethite particles wet-cake into water. The resultant slurry was mixed under stirring, and then subjected to filtering-out, water-washing, drying and then anti-sintering treatments.

Successively, the concentration of the slurry containing the acicular goethite particles after the anti-sintering treatment was adjusted to 100 g/liter, and then passed through a grinder "SUPER-MASUCOLLOIDER" (tradename, manufactured by Masuko Sangyo Co., Ltd.) operated at an axis-rotating speed of 2,000 rpm, five times to subject the slurry to milling treatment. Then, the resultant slurry was filtered out, washed with water and then dried, thereby obtaining acicular goethite particles oriented in the major axis direction thereof.

The thus obtained acicular goethite particles were heat-treated at 350° C. for 60 minutes, thereby obtaining hematite particles aggregates composed of aggregates of acicular hematite particles oriented in the major axis direction thereof.

It was confirmed that the thus obtained acicular hematite particles had an average major axis diameter of 0.159° C. an average minor axis diameter of 0.0088 μm and an aspect ratio of 18.1:1.

It was confirmed that and the obtained hematite particles aggregates had an average length of 0.167 μm, an average width of 0.020 μm, a ratio of average length to average width of 8.3:1, a BET specific surface area value of 117.4 $m^2/g$, a cyclohexanone absorption of 1.02 ml/g, an Al content of 1.98% by weight and an anti-sintering agent content of 0.96% by weight (calculated as $SiO_2$). In addition, the compressiblity of a coating film containing the hematite particles aggregates was 13.3%.

As a result of observation of the micrograph (×30,000) obtained by transmission electron microscope (TEM), it was confirmed that the hematite particles aggregates obtained were constituted by a plurality of the acicular hematite particles oriented in the major axis direction, more specifically, it was observed that 4 to 8 individual particles were oriented in the width direction plane of each aggregate and several individual particles were oriented in the thickness direction plane of each aggregate Example 2

<Production of Non-Magnetic Undercoat Layer>

12 g of the hematite particles aggregates as non-magnetic particles obtained in Example 1 were mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%. The resultant mixture was further kneaded for 30 minutes using a plast-mill thereby obtaining a kneaded material.

The obtained kneaded material together with 95 g of 1.5 mmφ glass beads, an additional amount of a binder resin solution (comprising 30% by weight of a polyurethane resin having a sodium sulfonate group, and 70% by weight of a mixed solvent containing methyl ethyl ketone and toluene at mixing ratio of 1:1), cyclohexanone, methyl ethyl ketone and toluene, were charged into a 140-ml glass bottle. The resultant mixture was mixed and dispersed for 6 hours using a paint shaker, thereby obtaining a non-magnetic coating material.

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight |

It was confirmed that the viscosity of the obtained non-magnetic coating material was 2,918 cP.

Then, the obtained non-magnetic coating material was applied onto a 12 I-thick polyethylene terephthalate film using an applicator with a coating thickness of 55 μm and then dried, thereby forming a non-magnetic undercoat layer.

It was confirmed that the thus obtained non-magnetic undercoat layer had a thickness of 3.50 μm, a gloss of 210%, a surface roughness Ra of 6.2 nm and a Young's modulus (relative value) of 134. In addition, it was confirmed that the thickness of the non-magnetic undercoat layer after calendering treatment was 3.03 μm and the compressiblity of the non-magnetic undercoat layer was 13.4%.

Example 3

<Production of Magnetic Recording Medium>

12 g of acicular magnetic metal particles containing iron as a main component (average major axis diameter: 0.115 μm; average minor axis diameter: 0.0158 μm; aspect ratio: 7.3:1; coercive force value: 139.3 kA/m (1,750 Oe), saturation magnetization value: 133 $Am^2/kg$ (133 emu/g)) were mixed with fine carbon black particles, an abrasive (alumina particles), a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 78%. The resultant mixture was further kneaded for 30 minutes using a plast-mill, thereby obtaining a kneaded material.

The obtained kneaded material together with 95 g of 1.5 mmφ glass beads, an additional amount of a binder resin solution (comprising 30% by weight of a polyurethane resin having a sodium sulfonate group, 35% by weight of toluene and 35% by weight of methyl ethyl ketone), cyclohexanone, toluene and methyl ethyl ketone, were charged into a 140-ml glass bottle. The resultant mixture was mixed and dispersed for 6 hours using a paint shaker, thereby obtaining a coating material. Then, the obtained coating material was further mixed with a lubricant and a curing agent as described below, and the resultant mixture was mixed and dispersed for 15 minutes using a paint shaker.

The obtained magnetic coating material had the following composition.

| Composition of magnetic coating material: | |
|---|---|
| Acicular magnetic metal particles containing iron as a main component | 100.0 parts by weight |
| Abrasive (alumina particles) | 10.0 parts by weight |
| Fine carbon black particles | 3.0 parts by weight |
| Vinyl chloride-vinyl acetate copolymer resin having a sodium sulfonate group | 10.0 parts by weight |
| Polyurethane resin having a sodium sulfonate group | 10.0 parts by weight |
| Lubricant (myristic acid:butyl) | 3.0 parts by weight |
| Curing agent (polyisocyanate) | 5.0 parts by weight |
| Cyclohexanone | 65.8 parts by weight |
| Methyl ethyl ketone | 164.5 parts by weight |
| Toluene | 98.7 parts by weight |

It was confirmed that the viscosity of the obtained magnetic coating material was 7,680 cP.

Then, the obtained magnetic coating material was applied onto the non-magnetic undercoat layer formed on the non-magnetic base film as obtained in Example 2, using an applicator with a coating thickness of 15 μm. Successively, the obtained coating film oriented in a magnetic field and then dried. It was confirmed that the thus obtained magnetic recording layer had a thickness of 1.08 μm, and the total thickness of the coating layers was 4.93 μm.

Then, the thus obtained product was subjected to calendering treatment at 85° C. under a load of 200 kg/cm four times, and then to curing reaction at 60° C. for 24 hours. The cured product was slit into a width of 1.27 cm (0.5 inch), thereby obtaining a magnetic tape. It was confirmed that the obtained magnetic tape had a total thickness of 4.36 μm, a coercive force value of 146.5 kA/m (1,841 Oe), a squareness of 0.89, a gloss of 234%, a surface roughness Ra of 5.6 nm and a Young's modulus (relative value) of 135. In addition, it was confirmed that the compressiblity of the magnetic tape was 11.6%; the running durability thereof was 26.8 minutes; and the scratch resistance thereof was rank A.

Acicular Goethite Particles A and B:

Acicular goethite particles A and B having properties as shown in Table 1 were prepared as the acicular goethite particles.

Examples 4 and 5 and Comparative Examples 1 to 6

The same procedure as defined in Example 1 was conducted except that kinds of acicular goethite particles, kinds and amounts of anti-sintering agent added in anti-sintering treatment, application or non-application of milling treatment, slurry concentration and axis-rotating speed in the milling treatment, and heat-treating temperature and time, were changed variously, thereby obtaining hematite particles aggregates as non-magnetic particles.

Main production conditions are shown in Table 2, and various properties of the obtained hematite particles aggregates are shown in Table 3.

Meanwhile, in Comparative Example 5, the goethite particles A were heat-dehydrated at 340° C. without previously subjecting to milling treatment, and then heat-treated at 650° C., thereby obtaining hematite particles. Also, in Comparative Example 6, there were used the goethite particles subjected only to milling treatment without the subsequent heat-treatments.

As a result of observation of the micrograph (×30,000) obtained by transmission electron microscope (TEM), it was confirmed that the hematite particles aggregates obtained were constituted by a plurality of the acicular hematite particles oriented in the major axis direction, more specifically, it was observed that 4 to 8 individual particles were oriented in the width direction plane of each aggregate and several individual particles were oriented in the thickness direction plane of each aggregate.

Also, it was confirmed that the hematite particles obtained in Comparative Example 1 were acicular hematite particles present in the form of the scatter in all direction, since these particles were not subjected to milling treatment.

Example 6
<Heat-Treatment in Aqueous Alkali Solution>

600 g of the hematite particles aggregates obtained in Example 4 were charged into 3.5 liters of pure water, and deaggregated for 60 minutes using a homomixer (manufactured by Tokushu Kika Kogyo Co., Ltd.).

Then, the obtained slurry containing the hematite particles aggregates was mixed and dispersed for 3 hours while circulating through a horizontal-type SGM ("DISPER-MAT SL" manufactured by S.C. Adichem Co., Ltd.) operated at an axis-rotating speed of 2,000 rpm. The obtained hematite particles aggregates contained in the slurry showed a residue on sieve of 0% when passed though a sieve of 325 mesh (sieve opening: 44 $\mu$m).

After the concentration of the slurry containing the hematite particles aggregates was adjusted to 100 g/liter, 5 liters of the slurry was taken out and mixed with a 6N NaOH aqueous solution while stirring, thereby adjusting the pH value thereof to 13.5. Then, the resultant slurry was heated to 95° C. under stirring, and maintained at the same temperature for 180 minutes.

Then, the slurry was washed with water by decantation method, thereby obtaining a slurry having a pH value of 10.5. For accuracy, at this time, the concentration of the slurry was measured and confirmed to be 96 g/liter.

The slurry was then subjected to filtration using a Buchner funnel, and the particles filtered out were washed with water by passing pure water therethrough until the conductivity of the resultant filtrate reached 30 $\mu$s or lower. The obtained particles were dried and then pulverized by ordinary methods, thereby obtaining high-purity hematite particles aggregates.

Main production conditions are shown in Table 4, and various properties of the obtained hematite particles aggregates are shown in Table 5.

Example 7

The same procedure as defined in Example 6 was conducted except that kinds of hematite particles aggregates, pH value of aqueous alkali solution, and heat-treating temperature and time were changed variously, thereby obtaining high-purity hematite particles aggregates.

Main production conditions are shown in Table 4, and various properties of the obtained high-purity hematite particles aggregates are shown in Table 5.

As a result of observation of the micrograph (×30,000) obtained by transmission electron microscope (TEM), it was confirmed that the hematite particles aggregates obtained in Examples 6 and 7 were constituted by a plurality of acicular hematite particles oriented in the major axis direction thereof even after the heat-treatment with aqueous alkali solution, without any deaggregation thereof, i.e., without breaking into individual particles.

Example 8
<Surface Coating Treatment>

10 kg of the hematite particles aggregates obtained in Example 4 were mixed with 75 liters of water, thereby obtaining a slurry containing the hematite particles aggregates. After the pH value of the re-dispersed slurry containing the hematite particles aggregates was adjusted to 10.5 by adding an aqueous sodium hydroxide solution thereto, water was added to the slurry to adjust the slurry concentration to 98 g/liter. 75 liters of the obtained slurry was heated to 60° C., and mixed with 4,083 ml of a 1.0-mol/liter sodium aluminate solution (equivalent to 1.5% by weight (calculated as Al) based on the weight of the hematite particles aggregates), and the resultant slurry was maintained at the same temperature for 30 minutes. Then, the pH value of the obtained slurry was adjusted to 7.5 by adding acetic acid thereto, and the slurry was further maintained under this condition for 30 minutes. Then, the particles were filtered out from the slurry, washed with water, dried and then pulverized, thereby obtaining hematite particles aggregates coated with hydroxides of aluminum.

Main production conditions are shown in Table 6, and various properties of the obtained surface-treated hematite particles aggregates are shown in Table 7.

Examples 9 to 11

The same procedure as defined in Example 8 was conducted except that the hematite particles aggregates obtained in Examples 5 to 7 were used, and kinds and amounts of surface coating materials were changed variously, thereby obtaining hematite particles aggregates coated with the surface coating material.

Main production conditions are shown in Table 6, and various properties of the obtained surface-treated hematite particles aggregates are shown in Table 7. Meanwhile, in the column "kind of coating material" of Table 6, "A" represents hydroxides of aluminum, and "S" represents oxides of silicon.

As a result of observation of the micrograph (×30,000) obtained by transmission electron microscope (TEM), it was confirmed that the hematite particles aggregates obtained in Examples 9 and 11 were constituted by a plurality of acicular hematite particles oriented in the major axis direction thereof even after the surface-coating treatment, without any deaggregation thereof, i.e., without breaking into individual particles.

Examples 12 to 19 and Comparative Examples 7 to 13
<Production of Non-Magnetic Undercoat Layer>

The same procedure as defined in Example 2 was conducted except that kinds of hematite particles aggregates were changed variously, thereby obtaining a non-magnetic undercoat layer.

Main production conditions and various properties of the obtained non-magnetic undercoat layers are shown in Table 8.

Magnetic Particles (1) to (3):

As the magnetic particles, there were used magnetic particles (1) to (3) having properties as shown in Table 9.

Examples 20 to 27 and Comparative Examples 14 to 20
<Production of Magnetic Recording Medium>

The same procedure as defined in Example 3 was conducted except that kinds of non-magnetic undercoat layers and kinds of magnetic particles were changed variously, thereby producing magnetic recording media.

Main production conditions and various properties of the obtained magnetic recording media are shown in Tables 10 and 11.

TABLE 1

Properties of acicular goethite particles

| Kind of starting particles | Average major axis diameter (μm) | Average minor axis diameter (μm) | Aspect ratio (—) | Al content (wt. %) |
|---|---|---|---|---|
| Goethite particles A | 0.193 | 0.0095 | 20.3:1 | 0.001 |
| Goethite particles B | 0.153 | 0.0084 | 18.2:1 | 4.51 |

TABLE 2

| Examples and Comparative Examples | Kind of acicular goethite particles | Anti-sintering treatment Kind | Calculated as | Amount added (wt. %) |
|---|---|---|---|---|
| Example 4 | Goethite particles A | Water glass #3 | SiO₂ | 0.75 |
| Example 5 | Goethite particles B | Phosphoric acid | P | 0.75 |
| Comparative Example 1 | Goethite particles A | Water glass #3 | SiO₂ | 0.75 |
| Comparative Example 2 | Goethite particles A | Water glass #3 | SiO₂ | 0.75 |
| Comparative Example 3 | Goethite particles A | Water glass #3 | SiO₂ | 0.75 |
| Comparative Example 4 | Goethite particles A | Water glass #3 | SiO₂ | 0.75 |
| Comparative Example 5 | Goethite particles A | Water glass #3 | SiO₂ | 0.75 |
| Comparative Example 6 | Goethite particles A | Water glass #3 | SiO₂ | 0.75 |

| Examples and Comparative Examples | Milling treatment Slurry concentration (g/l) | Rotating speed (rpm) | Heat-treatment Temperature (° C.) | Heat-treatment Time (min.) |
|---|---|---|---|---|
| Example 4 | 85 | 1,200 | 340 | 60 |
| Example 5 | 91 | 2,400 | 320 | 90 |
| Comparative Example 1 | — | — | 340 | 60 |
| Comparative Example 2 | 750 | 1,200 | 340 | 60 |
| Comparative Example 3 | 10 | 1,200 | 340 | 60 |
| Comparative Example 4 | 100 | 1,200 | 650 | 60 |
| Comparative Example 5 | — | — | 340 → 650 | 60 → 60 |
| Comparative Example 6 | 85 | 1,200 | — | — |

TABLE 3

Properties of hematite particles aggregates
Acicular hematite particles

| Examples and Comparative Examples | Average major axis diameter (μm) | Average minor axis diameter (μm) | Aspect ratio (—) |
|---|---|---|---|
| Example 4 | 0.178 | 0.0093 | 19.1:1 |
| Example 5 | 0.146 | 0.0082 | 17.8:1 |
| Comparative Example 1 | 0.179 | 0.0234 | 7.6:1 |
| Comparative Example 2 | 0.177 | 0.0204 | 8.7:1 |
| Comparative Example 3 | 0.179 | 0.0193 | 9.3:1 |
| Comparative Example 4 | 0.154 | 0.0229 | 6.7:1 |
| Comparative Example 5 | 0.150 | 0.0231 | 6.5:1 |
| Comparative Example 6 | 0.193 | 0.0095 | 20.3:1 |

Properties of hematite particles aggregates
Hematite particles aggregates

| Examples and Comparative Examples | Average length (μm) | Average width (μm) | Ratio of average length to average width (—) |
|---|---|---|---|
| Example 4 | 0.186 | 0.0224 | 8.3:1 |
| Example 5 | 0.161 | 0.0204 | 7.9:1 |
| Comparative Example 1 | — | — | — |
| Comparative Example 2 | — | — | — |
| Comparative Example 3 | — | — | — |
| Comparative Example 4 | — | — | — |
| Comparative Example 5 | — | — | — |
| Comparative Example 6 | 0.202 | 0.0219 | 9.2:1 |

Properties of hematite particles aggregates
Hematite particles aggregates

| Examples and Comparative Examples | BET specific surface area value (m²/g) | Cyclohexanone absorption (ml/g) | Al content (wt. %) |
|---|---|---|---|
| Example 4 | 112.6 | 0.98 | 0.003 |
| Example 5 | 160.4 | 1.16 | 4.98 |
| Comparative Example 1 | 128.5 | 0.56 | 0.003 |
| Comparative Example 2 | 124.6 | 0.52 | 0.003 |
| Comparative Example 3 | 120.9 | 0.54 | 0.003 |
| Comparative Example 4 | 51.6 | 0.53 | 0.003 |
| Comparative Example 5 | 50.6 | 0.51 | 0.003 |
| Comparative Example 6 | 113.1 | 1.26 | 0.002 |

Properties of hematite particles aggregates
Hematite particles aggregates
Amount of anti-sintering agent

| Examples and Comparative Examples | Calculated as | Content (wt. %) |
|---|---|---|
| Example 4 | SiO₂ | 0.70 |
| Example 5 | P | 0.63 |
| Comparative Example 1 | SiO₂ | 0.70 |
| Comparative Example 2 | SiO₂ | 0.70 |
| Comparative Example 3 | SiO₂ | 0.70 |
| Comparative Example 4 | SiO₂ | 0.70 |
| Comparative Example 5 | SiO₂ | 0.70 |
| Comparative Example 6 | SiO₂ | 0.75 |

TABLE 4

| Examples | Kind of hematite particles aggregates | Wet-pulverization Use or non-use | Residue on sieve (wt. %) |
|---|---|---|---|
| Example 6 | Example 4 | Used | 0 |
| Example 7 | Example 5 | Used | 0 |

| | Heat-treatment in aqueous alkali solution | | | |
|---|---|---|---|---|
| Examples | Use or non-use | pH value (−) | Temperature (° C.) | Time (min.) |
| Example 6 | Used | 13.5 | 95 | 180 |
| Example 7 | Used | 13.7 | 90 | 180 |

TABLE 5

Properties of high-purity hematite particles aggregates
Acicular hematite particles

| Examples | Average major axis diameter (μm) | Average minor axis diameter (μm) | Aspect ratio (−) |
|---|---|---|---|
| Example 6 | 0.178 | 0.0093 | 19.1:1 |
| Example 7 | 0.146 | 0.0082 | 17.8:1 |

Properties of high-purity hematite particles aggregates
Hematite particles aggregates

| Examples | Average length (μm) | Average width (μm) | Ratio of average length to average width (−) |
|---|---|---|---|
| Example 6 | 0.186 | 0.0224 | 8.3:1 |
| Example 7 | 0.161 | 0.0204 | 7.9:1 |

Properties of high-purity hematite particles aggregates
Hematite particles aggregates

| Examples | BET specific surface area value (m²/g) | Cyclohexanone absorption (ml/g) | Al content (wt. %) |
|---|---|---|---|
| Example 6 | 110.9 | 1.0 | 0.002 |
| Example 7 | 169.7 | 1.2 | 4.96 |

Properties of high-purity hematite particles aggregates
Hematite particles aggregates

| Examples | Soluble Na salt content (ppm) | Soluble sulfate content (ppm) | pH value of particles (−) |
|---|---|---|---|
| Example 6 | 112 | 12 | 9.1 |
| Example 7 | 83 | 6 | 9.3 |

TABLE 6

| | Kind of | Surface-treatment | |
|---|---|---|---|
| Examples | hematite particles aggregates | Kind | Amount added (wt. %) |
| Example 8 | Example 4 | Sodium aluminate | 1.5 |
| Example 9 | Example 5 | Water glass #3 | 0.5 |
| Example 10 | Example 6 | Sodium aluminate | 3.0 |
| Example 11 | Example 7 | Aluminum acetate | 1.5 |
| | | Water glass #3 | 1.0 |

| | Surface coating material | | |
|---|---|---|---|
| Examples | Kind | Calculated as | Amount coated (wt. %) |
| Example 8 | A | Al | 1.48 |
| Example 9 | S | SiO₂ | 0.50 |
| Example 10 | A | Al | 2.92 |
| Example 11 | A | Al | 1.48 |
| | S | SiO₂ | 0.96 |

TABLE 7

Properties of surface-treated hematite particles aggregates
Acicular hematite particles

| Examples | Average major axis diameter (μm) | Average minor axis diameter (μm) | Aspect ratio (−) |
|---|---|---|---|
| Example 8 | 0.178 | 0.0093 | 19.1:1 |
| Example 9 | 0.146 | 0.0082 | 17.8:1 |
| Example 10 | 0.178 | 0.0093 | 19.1:1 |
| Example 11 | 0.146 | 0.0082 | 17.8:1 |

Properties of surface-treated hematite particles aggregates
Hematite particles aggregates

| Examples | Average length (μm) | Average width (μm) | Ratio of average length to average width (−) |
|---|---|---|---|
| Example 8 | 0.186 | 0.0224 | 8.3:1 |
| Example 9 | 0.161 | 0.0204 | 7.9:1 |
| Example 10 | 0.186 | 0.0224 | 8.3:1 |
| Example 11 | 0.161 | 0.0204 | 7.9:1 |

Properties of surface-treated hematite particles aggregates
Hematite particles aggregates

| Examples | BET specific surface area value (m²/g) | Cyclohexanone absorption (ml/g) | Al content (wt. %) |
|---|---|---|---|
| Example 8 | 113.3 | 1.21 | 0.002 |
| Example 9 | 174.6 | 1.14 | 4.95 |
| Example 10 | 112.6 | 1.03 | 0.003 |
| Example 11 | 171.8 | 1.08 | 4.90 |

Properties of surface-treated hematite particles aggregates
Hematite particles aggregates

| Examples | Soluble Na salt content (ppm) | Soluble sulfate content (ppm) | pH value of particles (−) |
|---|---|---|---|
| Example 8 | — | — | — |
| Example 9 | — | — | — |
| Example 10 | 86 | 16 | 9.0 |
| Example 11 | 72 | 8 | 9.3 |

TABLE 8

Production of non-magnetic coating material

| Examples and Comparative Examples | Kind of non-magnetic particles | Weight ratio of particles to resin (−) | Properties of coating material Viscosity (cP) |
|---|---|---|---|
| Example 12 | Example 4 | 5.0 | 2,362 |
| Example 13 | Example 5 | 5.0 | 3,381 |
| Example 14 | Example 6 | 5.0 | 2,201 |
| Example 15 | Example 7 | 5.0 | 3,864 |
| Example 16 | Example 8 | 5.0 | 1,873 |
| Example 17 | Example 9 | 5.0 | 3,162 |
| Example 18 | Example 10 | 5.0 | 1,965 |
| Example 19 | Example 11 | 5.0 | 3,663 |
| Comparative Example 7 | Comparative Example 1 | 5.0 | 5,124 |
| Comparative Example 8 | Comparative Example 2 | 5.0 | 4,833 |
| Comparative Example 9 | Comparative Example 3 | 5.0 | 4,620 |
| Comparative Example 10 | Comparative Example 4 | 5.0 | 914 |
| Comparative Example 11 | Comparative Example 5 | 5.0 | 384 |
| Comparative Example 12 | Comparative Example 6 | 5.0 | 9,864 |
| Comparative Example 13 | Goethite particles A | 5.0 | 10,520 |

Properties of non-magnetic undercoat layer Before calender treatment

| Examples and Comparative Examples | Thickness (μm) | Gloss (%) | Surface roughness Ra (nm) | Young's modulus (relative value) (−) |
|---|---|---|---|---|
| Example 12 | 3.91 | 208 | 6.4 | 133 |
| Example 13 | 3.77 | 206 | 6.2 | 135 |
| Example 14 | 3.82 | 213 | 6.0 | 134 |
| Example 15 | 3.90 | 209 | 5.8 | 136 |
| Example 16 | 3.78 | 213 | 6.2 | 136 |
| Example 17 | 3.86 | 216 | 6.0 | 138 |
| Example 18 | 3.89 | 223 | 5.8 | 138 |
| Example 19 | 3.84 | 228 | 5.4 | 141 |
| Comparative Example 7 | 3.95 | 177 | 8.8 | 122 |
| Comparative Example 8 | 3.92 | 180 | 8.7 | 121 |
| Comparative Example 9 | 3.88 | 182 | 8.5 | 122 |
| Comparative Example 10 | 3.77 | 181 | 8.4 | 124 |
| Comparative Example 11 | 3.51 | 193 | 7.0 | 126 |
| Comparative Example 12 | 3.64 | 144 | 10.5 | 122 |
| Comparative Example 13 | 3.84 | 138 | 11.2 | 121 |

Production of non-magnetic undercoat layer

| Examples and Comparative Examples | After calender treatment Thickness (μm) | Compressibility of coating film (%) |
|---|---|---|
| Example 12 | 3.31 | 13.1 |
| Example 13 | 3.27 | 13.3 |
| Example 14 | 3.30 | 13.6 |
| Example 15 | 3.36 | 13.8 |
| Example 16 | 3.27 | 13.5 |
| Example 17 | 3.32 | 14.0 |
| Example 18 | 3.35 | 13.9 |
| Example 19 | 3.28 | 14.6 |
| Comparative Example 7 | 3.68 | 6.8 |
| Comparative Example 8 | 3.64 | 7.1 |
| Comparative Example 9 | 3.60 | 7.2 |
| Comparative Example 10 | 3.55 | 5.8 |
| Comparative Example 11 | 3.33 | 5.1 |
| Comparative Example 12 | 3.36 | 7.7 |
| Comparative Example 13 | 3.59 | 6.5 |

TABLE 9

| Magnetic particles | Kind |
|---|---|
| Magnetic particles (1) | Magnetic metal particles containing iron as a main component |
| Magnetic particles (2) | Magnetic metal particles containing iron as a main component |
| Magnetic particles (3) | Barium ferrite particles (Ti/Fe = 1.5 mol %; Ni/Fe = 2.8 mol %) |

Properties of magnetic particles

| Magnetic particles | Average major axis diameter (μm) | Average minor axis diameter (μm) | Aspect ratio (plate ratio) (−) |
|---|---|---|---|
| Magnetic particles (1) | 0.153 | 0.0184 | 8.3:1 |
| Magnetic particles (2) | 0.101 | 0.0129 | 7.8:1 |
| Magnetic particles (3) | 0.032 | 0.0090 | 3.6:1 |

Properties of magnetic particles

| Magnetic particles | Coercive force value kA/m | Coercive force value Oe | Saturation magnetization value $Am^2/kg$ | Saturation magnetization value emu/g |
|---|---|---|---|---|
| Magnetic particles (1) | 128.1 | 1,610 | 131.3 | 131.3 |
| Magnetic particles (2) | 147.5 | 1,853 | 136.0 | 136.0 |
| Magnetic particles (3) | 205.9 | 2,587 | 50.1 | 50.1 |

TABLE 10

Production of magnetic recording medium

| Examples and Comparative Examples | Kind of non-magnetic undercoat layer | Kind of magnetic particles | Weight ratio of particles to resin (−) |
|---|---|---|---|
| Example 17 | Example 12 | Magnetic particles (1) | 5.0 |
| Example 18 | Example 13 | Magnetic particles (1) | 5.0 |
| Example 19 | Example 14 | Magnetic particles (1) | 5.0 |
| Example 20 | Example 15 | Magnetic particles (1) | 5.0 |
| Example 21 | Example 16 | Magnetic particles (1) | 5.0 |
| Example 22 | Example 17 | Magnetic particles (1) | 5.0 |
| Example 23 | Example 18 | Magnetic particles (2) | 5.0 |
| Example 24 | Example 19 | Magnetic particles (3) | 5.0 |
| Comparative Example 14 | Comparative Example 7 | Magnetic particles (1) | 5.0 |
| Comparative Example 15 | Comparative Example 8 | Magnetic particles (1) | 5.0 |
| Comparative Example 16 | Comparative Example 9 | Magnetic particles (1) | 5.0 |
| Comparative Example 17 | Comparative Example 10 | Magnetic particles (1) | 5.0 |
| Comparative Example 18 | Comparative Example 11 | Magnetic particles (1) | 5.0 |
| Comparative Example 19 | Comparative Example 12 | Magnetic particles (1) | 5.0 |
| Comparative Example 20 | Comparative Example 13 | Magnetic particles (1) | 5.0 |

TABLE 10-continued

Production of magnetic recording medium

| Examples and Comparative Examples | Thickness of magnetic layer (μm) | Total thickness of coating layer before calender treatment (μm) | Total thickness of coating layer after calender treatment (μm) | Compressibility of coating film (%) |
|---|---|---|---|---|
| Example 17 | 1.05 | 4.86 | 4.29 | 11.7 |
| Example 18 | 1.06 | 4.83 | 4.26 | 11.8 |
| Example 19 | 1.07 | 4.89 | 4.31 | 11.9 |
| Example 20 | 1.09 | 4.99 | 4.38 | 12.2 |
| Example 21 | 1.08 | 4.86 | 4.26 | 12.3 |
| Example 22 | 1.13 | 4.99 | 4.36 | 12.6 |
| Example 23 | 1.12 | 5.01 | 4.39 | 12.4 |
| Example 24 | 1.01 | 4.85 | 4.26 | 12.2 |
| Comparative Example 14 | 1.13 | 5.08 | 4.76 | 6.3 |
| Comparative Example 15 | 1.09 | 5.01 | 4.68 | 6.6 |
| Comparative Example 16 | 1.11 | 4.99 | 4.65 | 6.8 |
| Comparative Example 17 | 1.10 | 4.87 | 4.61 | 5.3 |
| Comparative Example 18 | 1.08 | 4.86 | 4.58 | 5.8 |
| Comparative Example 19 | 1.02 | 4.63 | 4.31 | 6.9 |
| Comparative Example 20 | 1.03 | 4.79 | 4.50 | 6.1 |

TABLE 11

| Examples and Comparative Examples | Properties of magnetic recording medium | | |
|---|---|---|---|
| | Coercive force value | | Br/Bm |
| | kA/m | Oe | (−) |
| Example 17 | 136.1 | 1,710 | 0.88 |
| Example 18 | 136.9 | 1,720 | 0.89 |
| Example 19 | 136.6 | 1,716 | 0.89 |
| Example 20 | 136.3 | 1,713 | 0.89 |
| Example 21 | 135.7 | 1,705 | 0.90 |
| Example 22 | 134.7 | 1,693 | 0.90 |
| Example 23 | 152.3 | 1,914 | 0.89 |
| Example 24 | 208.2 | 2,616 | 0.88 |
| Comparative Example 14 | 134.6 | 1,692 | 0.85 |
| Comparative Example 15 | 134.7 | 1,693 | 0.85 |
| Comparative Example 16 | 135.4 | 1,701 | 0.85 |
| Comparative Example 17 | 135.1 | 1,698 | 0.86 |
| Comparative Example 18 | 135.1 | 1,667 | 0.87 |
| Comparative Example 19 | 134.6 | 1,673 | 0.84 |
| Comparative Example 20 | 134.3 | 1,682 | 0.82 |

| Examples and Comparative Examples | Properties of magnetic recording medium | | |
|---|---|---|---|
| | Gloss (%) | Surface roughness Ra (nm) | Young's modulus (relative value) (−) |
| Example 17 | 228 | 6.0 | 134 |
| Example 18 | 232 | 5.7 | 138 |
| Example 19 | 231 | 5.6 | 136 |
| Example 20 | 237 | 5.5 | 136 |
| Example 21 | 234 | 5.6 | 138 |
| Example 22 | 239 | 5.3 | 139 |
| Example 23 | 230 | 5.8 | 138 |
| Example 24 | 226 | 5.9 | 140 |
| Comparative Example 14 | 189 | 9.1 | 123 |
| Comparative Example 15 | 190 | 8.8 | 124 |
| Comparative Example 16 | 191 | 8.7 | 124 |
| Comparative Example 17 | 193 | 8.7 | 126 |
| Comparative Example 18 | 207 | 6.8 | 126 |
| Comparative Example 19 | 194 | 7.8 | 123 |
| Comparative Example 20 | 188 | 9.7 | 120 |

| Examples and Comparative Examples | Properties of magnetic recording medium | | | |
|---|---|---|---|---|
| | Durability | | Corrosion resistance | |
| | Running durability (min.) | Scratch resistance (−) | Change rate of coercive force value (%) | Change rate of saturation magnetization value (%) |
| Example 17 | — | — | — | — |
| Example 18 | 25.6 | B | — | — |
| Example 19 | — | — | 5.3 | 6.2 |
| Example 20 | 27.5 | A | 6.4 | 6.9 |
| Example 21 | — | — | — | — |
| Example 22 | ≧30 | A | — | — |
| Example 23 | — | — | 3.8 | 4.3 |
| Example 24 | 27.8 | A | 2.1 | 2.6 |
| Comparative Example 14 | — | — | — | — |
| Comparative Example 15 | — | — | — | — |
| Comparative Example 16 | — | — | — | — |
| Comparative Example 17 | — | — | — | — |
| Comparative Example 18 | — | — | — | — |
| Comparative Example 19 | — | — | — | — |
| Comparative Example 20 | — | — | — | — |

What is claimed is:

1. Hematite particles aggregates comprising aggregates of acicular hematite particles oriented in a major axis direction thereof, said acicular hematite particles having an average major axis diameter of 0.005 to 0.3 μm and an average minor axis diameter of 0.0005 to 0.10 μm, said hematite particles aggregates exhibiting a compressiblity of a coating film of 9.0 to 20.0%, when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having solid content of 72%, and a resultant mixture is further kneaded for 30 minutes using a plast-mill to obtain a kneaded material;

(ii) the obtained kneaded material together with 95 g of 1.5 mmφ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

Composition of non-magnetic coating material:

| | |
|---|---|
| Hematite particles aggregates | 100 parts by weight |
| Vinyl chloride-vinyl acetate copolyner resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 μm and then dried, thereby forming a non-magnetic undercoat layer; and (iv) the thus obtained dried non-magnetic undercoat layer is subjected to calendering treatment at 85° C. under a load of 200 kg/cm four times, and the compressibility of the coating film is calculated from thicknesses $t_0$ (μm) and $t_1$ (μm) of the coating film before and after the calendering treatment, respectively, according to the following formula:

Compressiblity of coating film (%)=$\{(t_0-t_1)/t_0\} \times 100$ wherein $t_0$ represents a thickness of the non-magnetic undercoat layer before the calendering treatment; and $t_1$ represents a thickness of the non-magnetic undercoat layer after the calendering treatment.

2. Hematite particles aggregates according to claim 1, having a specific surface area value of 100 to 250 m²/g, and a cyclohexanone absorption of not less than 0.6 ml/g.

3. Hematite particles aggregates according to claim 1, having an average length of 0.005 to 0.6 μm, an average width of 0.001 to 0.4 μm, and a ratio of the average length to the average width of usually 1.5:1 to 15:1.

4. Hematite particles aggregates according to claim 1, wherein a surface of said aggregates of the hematite particles are coated with at least one surface coating material selected from the group consisting of hydroxides of aluminum, oxides of aluminum, hydroxides of silicon and oxides of silicon.

5. A magnetic recording medium comprising a non-magnetic base; a non-magnetic undercoat layer formed on the non-magnetic base which comprises the hematite particles aggregates as defined in claim 4, and a binder resin; and a magnetic recording layer formed on the non-magnetic undercoat layer which comprises magnetic particles and a binder resin, and having a coercive force value of 39.8 to 318.3 kA/m (500 to 4,000 Oe), a squareness (residual magnetic flux density Br/saturation magnetic flux density Bm) of 0.85 to 0.95, a gloss of coating film of 170 to 300%, a surface roughness Ra of coating film of not more than 8.5 nm, a Young's modulus of 128 to 160, and a compressiblity of 7.5 to 19.0% when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mmφ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

Composition of non-magnetic coating material:

| | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 μm and then dried, thereby forming a non-magnetic undercoat layer;

(iv) 12 g of magnetic particles are mixed with fine carbon black particles, alumina particles as an abrasive, a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 78%, and a resultant mixture is further kneaded for 30 minutes using a plast-mill to obtain a kneaded material;

(v) the obtained kneaded material together with 95 g of 1.5 mmφ glass beads, an additional amount of a binder resin solution (comprising 30% by weight of a polyurethane resin having a sodium sulfonate group, 35% by weight of toluene and 35% by weight of methyl ethyl ketone), cyclohexanone, toluene and methyl ethyl ketone, are charged into a 140-ml glass bottle at the following mixing ratio; a resultant mixture is mixed and dispersed for 6 hours using a paint shaker to obtain a coating material; the obtained coating material is further mixed with a lubricant and a curing agent: and a resultant mixture is mixed and dispersed for 15 minutes using a paint shaker, thereby obtaining a magnetic coating material:

| Composition of magnetic coating material: | |
|---|---|
| Magnetic particles | 100.0 parts by weight |
| Abrasive (alumina particles) | 10.0 parts by weight |
| Fine carbon black particles | 3.0 parts by weight |
| vinyl chloride-vinyl acetate copolymer resin having a sodium sulfonate group | 10.0 parts by weight |
| Polyurethane resin having a sodium sulfonate group | 10.0 parts by weight |
| Lubricant (myristic acid:butyl stearate = 1:2) | 3.0 parts by weight |
| curing agent (polyisocyanate) | 5.0 parts by weight |
| Cyclohexanone | 65.8 parts by weight |
| Methyl ethyl ketone | 164.5 parts by weight |
| Toluene | 98.7 parts by weight; |

(vi) the obtained magnetic coating material is applied onto the non-magnetic undercoat layer formed on the base film using an applicator with a coating thickness of 15 μm and then dried, thereby forming a coating film, and a resultant coating film is oriented in a magnetic field and then dried, thereby obtaining a magnetic layer; and (vii) the thus obtained coating film is subjected to calendering treatment at 85° C. under a load of 200 kg/cm four times, and the compressiblity of the coating film is calculated from thicknesses $t_2$ (μm) and $t_3$ (μm) of the coating film before and after the calendering treatment, respectively, according to the following formula:

Compressiblity of coating film (%)={$(t_2-t_3)/t_2$}×100 wherein $t_2$ represents a total thickness of the non-magnetic undercoat layer and the magnetic layer before the calendering treatment; and $t_3$ represents a total thickness of the non-magnetic undercoat layer and the magnetic layer after the calendering treatment.

6. Hematite particles aggregates according to claim 1, having a soluble sodium salt content of not more than 300 ppm calculated as Na, and a soluble sulfate content of not more than 150 ppm calculated as $SO_4$.

7. Hematite particles aggregates according to claim 1, wherein said acicular hematite particles have an aspect ratio (ratio of average major axis diameter to average minor axis diameter) of 3:1 to 30:1.

8. Hematite particles aggregates according to claim 1, having a specific surface area value of 110.9 to 250 m²/g, and a compressiblity of 9.5 to 20.0%.

9. Hematite particles aggregates according to claim 1, having a specific surface area value of 110.9 to 225 m²/g, and a compressiblity of 11.0 to 20.0%.

10. A non-magnetic substrate for a magnetic recording medium comprising a non-magnetic base film, and a non-magnetic undercoat layer formed on the non-magnetic base film which comprises the hematite particles aggregates as defined in claim 1, and a binder resin.

11. A non-magnetic substrate for a magnetic recording medium according to claim 10, which further have a gloss of 180 to 300%, a surface roughness Ra of coating film of 0.5 to 8.0 nm, and a compressiblity of 9.0 to 20.0%.

12. A magnetic recording medium comprising a non-magnetic substrate; a non-magnetic undercoat layer formed on the non-magnetic base film which comprises the hematite particles aggregates as defined in claim 1, and a binder resin; and a magnetic recording layer formed on the non-magnetic undercoat layer which comprises magnetic particles and a binder resin.

13. A magnetic recording medium according to claim 12, which further have a coercive force value of 39.8 to 318.3 kA/m (500 to 4,000 Oe), a squareness (residual magnetic flux density Br/saturation magnetic flux density Bm) of 0.85 to 0.95, a gloss of coating film of 170 to 300%, a surface roughness Ra of coating film of not more than 8.5 nm, and a compressiblity of 7.5 to 19.0% when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mmφ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 μm and then dried, thereby forming a non-magnetic undercoat layer;

(iv) 12 g of magnetic particles are mixed with fine carbon black particles, alumina particles as an abrasive, a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 78%, and a resultant mixture is further kneaded for 30 minutes using a plast-mill to obtain a kneaded material;

(v) the obtained kneaded material together with 95 g of 1.5 mmφ glass beads, an additional amount of a binder resin solution (comprising 30% by weight of a polyurethane resin having a sodium sulfonate group, 35% by weight of toluene and 35% by weight of methyl ethyl ketone), cyclohexanone, toluene and methyl ethyl ketone, are charged into a 140-ml glass bottle at the following mixing ratio; a resultant mixture is mixed and dispersed for 6 hours using a paint shaker to obtain a coating material; the obtained coating material is further mixed with a lubricant and a curing agent: and a resultant mixture is mixed and dispersed for 15 minutes using a paint shaker, thereby obtaining a magnetic coating material:

| Composition of magnetic coating material: | |
|---|---|
| Magnetic particles | 100.0 parts by weight |
| Abrasive (alumina particles) | 10.0 parts by weight |
| Fine carbon black particles | 3.0 parts by weight |
| Vinyl chloride-vinyl acetate copolymer resin having a sodium sulfonate group | 10.0 parts by weight |
| Polyurethane resin having a sodium sulfonate group | 10.0 parts by weight |
| Lubricant (myristic acid:butyl stearate = 1:2) | 3.0 parts by weight |
| Curing agent (polyisocyanate) | 5.0 parts by weight |
| Cyclohexanone | 65.8 parts by weight |
| Methyl ethyl ketone | 164.5 parts by weight |
| Toluene | 98.7 parts by weight; |

(vi) the obtained magnetic coating material is applied onto the non-magnetic undercoat layer formed on the non-magnetic base film using an applicator with a coating thickness of 15 $\mu$m and then dried, thereby forming a coating film, and a resultant coating film is oriented in a magnetic field and then dried, thereby obtaining a magnetic layer; and (vii) the thus obtained coating film is subjected to calendering treatment at 85 under a load of 200 kg/cm four times, and the compressiblity of the coating film is calculated from thicknesses $t_2$ ($\mu$m) and $t_3$ ($\mu$m) of the coating film before and after the calendering treatment, respectively, according to the following formula:

Compressiblity of coating film (%)=$\{(t_2-t_3)/t_2\}\times 100$ wherein $t_2$ represents a total thickness of the non-magnetic undercoat layer and the magnetic layer before the calendering treatment; and $t_3$ represents a total thickness of the non-magnetic undercoat layer and the magnetic layer after the calendering treatment.

14. A non-magnetic substrate for a magnetic recording medium comprising a non-magnetic base film, and a non-magnetic undercoat layer formed on the non-magnetic base film which comprises the hematite particles aggregates as defined in claim 1, and a binder resin, and exhibits a gloss of 180 to 300%, a surface roughness Ra of coating film of 0.5 to 8.0 nm, and a compressiblity of coating film of 9.5 to 20% when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mm$\phi$ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 $\mu$m and then dried, thereby forming a non-magnetic undercoat layer; and (iv) the thus obtained non-magnetic undercoat layer is subjected to calendering treatment at 85° C. under a load of 200 kg/cm four times, and the compressiblity of the coating film is calculated from thicknesses $t_0$ ($\mu$m) and $t_1$ ($\mu$m) of the coating film before and after the calendering treatment, respectively, according to the following formula:

Compressiblity of coating film (%)=$\{(t_0-t_1)/t_0\}\times 100$ wherein $t_0$ represents a thickness of the non-magnetic undercoat layer before the calendering treatment; and $t_1$ represents a thickness of the non-magnetic undercoat layer after the calendering treatment.

15. Hematite particles aggregates comprising aggregates of acicular hematite particles oriented in a major axis direction thereof, said acicular hematite particles having an average major axis diameter of 0.005 to 0.3 $\mu$m and an average minor axis diameter of 0.0005 to 0.10 $\mu$m, said hematite particles aggregates exhibiting a specific surface area value of 100 to 250 m$^2$/g, a cyclohexanone absorption of not less than 0.6 ml/g, a soluble sodium salt content of not more than 300 ppm, calculated as Na, a soluble sulfate content of not more than 150 ppm calculated as SO$_4$, and a compressiblity of coating film of 9.0 to 20.0% when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mm$\phi$ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 μm and then dried, thereby forming a non-magnetic undercoat layer; and (iv) the thus obtained dried non-magnetic undercoat layer is subjected to calendering treatment at 85° C. under a load of 200 kg/cm four times, and the compressiblity of the coating film is calculated from thicknesses $t_0$ (μm) and $t_1$ (μm) of the coating film before and after the calendering treatment, respectively, according to the following formula:

Compressiblity of coating film (%) = $\{(t_0-t_1)/t_0\} \times 100$ wherein $t_0$ represents a thickness of the non-magnetic undercoat layer before the calendering treatment; and $t_1$ represents a thickness of the non-magnetic undercoat layer after the calendering treatment.

16. Hematite particles aggregates comprising aggregates of acicular hematite particles oriented in a major axis direction thereof, said acicular hematite particles having an average major axis diameter of 0.005 to 0.3 μm and an average minor axis diameter of 0.0005 to 0.10 μm, said hematite particles aggregates having a surface-coating layer composed of at least one selected from the group consisting of hydroxides of aluminum, oxides of aluminum, hydroxides of silicon and oxides of silicon, and having a specific surface area value of 100 to 250 m²/g, a cyclohexanone absorption of not less than 0.6 ml/g, a soluble sodium salt content of not more than 300 ppm calculated as Na, a soluble sulfate content of not more than 150 ppm calculated as $SO_4$, and a compressiblity of coating film of 9.0 to 20.0% when measured by the following method:

(i) 12 g of the hematite particles aggregates are mixed with a binder resin solution (containing 30% by weight of a vinyl chloride-vinyl acetate copolymer resin having a sodium sulfonate group, and 70% by weight of cyclohexanone) and cyclohexanone, thereby obtaining a mixture having a solid content of 72%, and a resultant mixture is further kneaded for 30 minutes using a plast-mill to obtain a kneaded material;

(ii) the obtained kneaded material together with 95 g of 1.5 mmφ glass beads, an additional amount of a binder resin solution (comprising 30% by weight of a polyurethane resin having a sodium sulfonate group, and 70% by weight of a mixed solvent composed of methyl ethyl ketone and toluene at mixing ratio of 1:1), cyclohexanone, methyl ethyl ketone and toluene, are charged into a 140-ml glass bottle at the following mixing ratio; and a resultant mixture is mixed and dispersed for 6 hours using a paint shaker, thereby obtaining a non-magnetic coating material:

| Composition of non-magnetic coating material: | |
|---|---|
| Hematite particles aggregates | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methyl ethyl ketone | 111.4 parts by weight |
| Toluene | 66.9 parts by weight; |

(iii) then, the obtained non-magnetic coating material is applied onto a non-magnetic base film using an applicator with a coating thickness of 55 μm and then dried, thereby forming a coating film; and (iv) the thus obtained coating film is subjected to calendering treatment at 85° C. under a load of 200 kg/cm four times, and the compressiblity of the coating film is calculated from thicknesses $t_0$ (μm) and $t_1$ (μM) of the coating film before and after the calendering treatment, respectively, according to the following formula:

Compressiblity of coating film (%) = $\{(t_0-t_1)/t_0\} \times 100$ wherein $t_0$ represents a thickness of the non-magnetic undercoat layer before the calendering treatment; and $t_1$ represents a thickness of the non-magnetic undercoat layer after the calendering treatment.

* * * * *